United States Patent [19]
Maynard

[11] Patent Number: 5,872,880
[45] Date of Patent: Feb. 16, 1999

[54] HYBRID-OPTICAL MULTI-AXIS BEAM STEERING APPARATUS

[75] Inventor: Ronald S. Maynard, 777 Hollenbeck #15Q, Sunnyvale, Calif. 94087

[73] Assignee: Ronald S. Maynard, San Jose, Calif.

[21] Appl. No.: 695,717

[22] Filed: Aug. 12, 1996

[51] Int. Cl.[6] .................................................. G02B 6/36
[52] U.S. Cl. ............................. 385/88; 385/18; 385/19; 385/83
[58] Field of Search ..................... 385/88–94, 16–23, 385/25, 83

[56] References Cited

U.S. PATENT DOCUMENTS

| | | | |
|---|---|---|---|
| 4,505,539 | 3/1985 | Auracher et al. | 385/18 |
| 4,854,685 | 8/1989 | Stanley | 385/18 |
| 4,923,745 | 5/1990 | Blonder | 385/18 |
| 5,208,880 | 5/1993 | Riza et al. | 385/25 |
| 5,325,116 | 6/1994 | Sampsell | 346/108 |
| 5,448,546 | 9/1995 | Pauli | 369/112 |
| 5,504,614 | 4/1996 | Webb et al. | 359/223 |

FOREIGN PATENT DOCUMENTS

| | | | |
|---|---|---|---|
| 0 331 331 A2 | 6/1989 | European Pat. Off. | G02B 6/42 |
| 0 614 101 A2 | 7/1994 | European Pat. Off. | G02B 26/08 |
| 0 650 133 A2 | 4/1995 | European Pat. Off. | G06K 7/10 |
| WO95/13638 | 5/1995 | WIPO | H01S 3/085 |

*Primary Examiner*—Hung N. Ngo
*Attorney, Agent, or Firm*—Wilson Sonsini Goodrich & Rosati

[57] ABSTRACT

An apparatus for precisely steering a beam of light by making use of a hybrid inter optical alignment precision which occurs when a beam steering mechanism is micromachined with respect to a crystallographic orientation of a substrate.

45 Claims, 17 Drawing Sheets

HYBRID-OPTICAL MULTI-AXIS BEAM STEERING APPARATUS

BACKGROUND

The field of the present invention relates, in general, to methods and devices for manipulating and steering beams of light. More specifically, the field of the invention relates to a compact, hybrid system of optical components that accept a beam of light from an optical element or fiber, steer the beam in one or more directions, and pass the deflected beam into open space or through a secondary optical element or fiber.

Investigators of optical phenomenon typically rely on massive, vibration damped optical benches to maintain precise alignment between optical elements during prototyping. Optical elements might consist of lenses, mirrors, beam splitters, piezoelectric actuators, translation tables, prisms, screens, lasers, optical fibers, gratings, etc. Quite commonly, these elements are macroscopic in size and can easily be handled and adjusted. Although suitable for most optical prototyping purposes, the use of macroscopic optical elements can have its drawbacks.

For example, to precisely steer a beam of light at a high angular rate, one might employ a conventional piezo motor, or angular galvanometer, and mirror assembly. Using two such devices at right angles to one another in the same optical path would give two degrees of freedom for controlling the path of the beam. This arrangement is commonly used for steering laser beams in "laser show" productions. In this application, the physiological demands of human eyesight require only a 30 to 60 Hertz refresh cycle of each laser scanned frame to provide the illusion of smooth motion. Given that the reflected laser light is of adequate intensity at the maximum angular slew rate, the overall angular size and detail of a single frame will be limited by the total path length traced out to form that frame. That is to say, the angular extent of a laser image is limited by the maximum angular slew rate of each steering mirror.

One apparent solution might be to increase the torquing capability of the mirror driving motor. This is effective to a point. With increasing torque capability, the angular inertial mass of the rotor elements becomes ever larger. At some point, the mechanical dynamics of the coupled motor/mirror system will suffer. Unwanted torsional deflections will be introduced that result in beam steering errors. Stiffening the rotor might remedy the deflection problem, but would again increase the angular inertial mass. Thus, motor sizing is not a complete panacea.

A better solution would be to significantly reduce the size, and therefore, the mass and angular inertia of the moving mirror. There is no torque penalty in doing so. However, care must be taken to insure that the stiffness of the lighter mirror remains high so that dynamic distortion of the mirror itself does not compromise optical performance.

Beam steering devices and their functional equivalents, are found in a wide variety of products including laser bar scanners, CD ROM heads, laser printers, optical switches, robotic vision scanners, optical choppers, optical modulators and display devices to name a few.

In the field of micromechanics, a number of recent developments in the area of spatial light modulators (SLM), light valves, and deformable mirror devices (DMD) have resulted in a significant cost reduction and a substantial increase in performance of beam steering devices.

TEXAS INSTRUMENTS holds a number of DMD patents including U.S. Pat. Nos. 5,504,614 and 5,448,546 that describe methods of fabricating electrically controllable micromirrors using an additive process. The micromirrors may operate independently or within a distributed array. The micromirrors are generally of torsion or gimbaled hinge design.

An additional U.S. Pat. No. 5,325,116 held by TEXAS INSTRUMENTS describes a beam steering device used for writing to and reading from an optical storage media using a micromachined SLM. Although the single SLM component has the potential to greatly improve the mechanical dynamic response of the overall device, the surrounding structure within which the SLM resides remains bulky.

What is needed is a faster, more precise and compact apparatus for steering beams of light. In particular, it would be advantageous to miniaturize a complete optical system upon a single substrate, including lenses, optical fibers, optical sensors, SLMs and the like. Not only would performance be greatly enhanced due to smaller moving masses, but manufacturing costs and uniformity would also be improved.

Reducing all dimensions proportionately on a given mirror design results in a reduction of surface area by an inverse squared term and a reduction of volume and mass by an inverse cubed term. Thus, by diminishing the size of any object, the surface-area-to-mass-ratio will increase linearly. Consequently, surface force reactions such as surface tension, electrostatics and Van der Waals forces, become more significant, while gravitational and inertial forces becomes less of a factor in governing the static and dynamic equations of motion.

The angular inertia of a rectangular plate about a center line lying in the plane of the plate, is linearly proportional to the mass of the plate. It is also proportional to the square of the width of the plate which is perpendicular to that axis. Therefore, if all dimensions of a plate are reduced by a factor of two, then the final mass would be the inverse cube of two, or one eighth of the original mass. The inertial mass, sometimes referred to as the mass moment of inertia, of the smaller plate would then be one eighth times the inverse square of two or one thirty-second times the original mass.

Since the angular acceleration of a body is directly proportional to an externally applied torque and inversely proportional to its angular inertial mass, one can conclude that halving all plate dimensions will result in thirty two fold increase in angular acceleration for a given torque.

As is commonly known, electrostatic force is an effective means for moving small, micromachined components. The force produced between an electrostatically charged plate and ground is directly proportional to the plate's surface area and inversely proportional to the square of the plate-to-ground gap for a given voltage. Thus, if all dimensions are again halved, the electrostatic force generated between the plate and ground would be equal to the initial force for a given voltage.

By taking the previous dynamic and electrostatic arguments into consideration, it can be surmised that by halving all dimensions of an electrostatically driven plate, the dynamic response would be improved by a factor of thirty two for a given driving voltage. More generally, assuming that the driving voltage is such that electrostatic breakdown of air and insulators does not occur, then the dynamic response of an electrostatically driven plate will increases as the inverse forth power of size reduction.

SUMMARY

An aspect of the invention provides a method and apparatus for precisely steering a beam of light by making use of a hybrid inter-optical alignment precision which occurs when a beam steering mechanism is micromachined with respect to a crystallographic orientation of a substrate.

That is, it has been found that an optical element such as a micromachined mirror may be aligned precisely in an optimal axis for beam propagation and steering by using micromachining techniques which take advantage of the crystallographic orientation of a substrate.

An aspect of the invention provides a micromachined mirror which is capable of steering a beam of light with multiple degrees of freedom. The micromachined mirror is advantageously characterized by extremely small mass and high frequency response while at the same time exhibiting high tolerance to vibration noise.

In another aspect of the invention, the micromirror is precisely steered by the application of a controlled electrostatic effect, in either a current or a voltage mode.

These and other aspects of the invention will be appreciated from the following detailed description and drawings.

DETAILED DESCRIPTION

Figure 1:
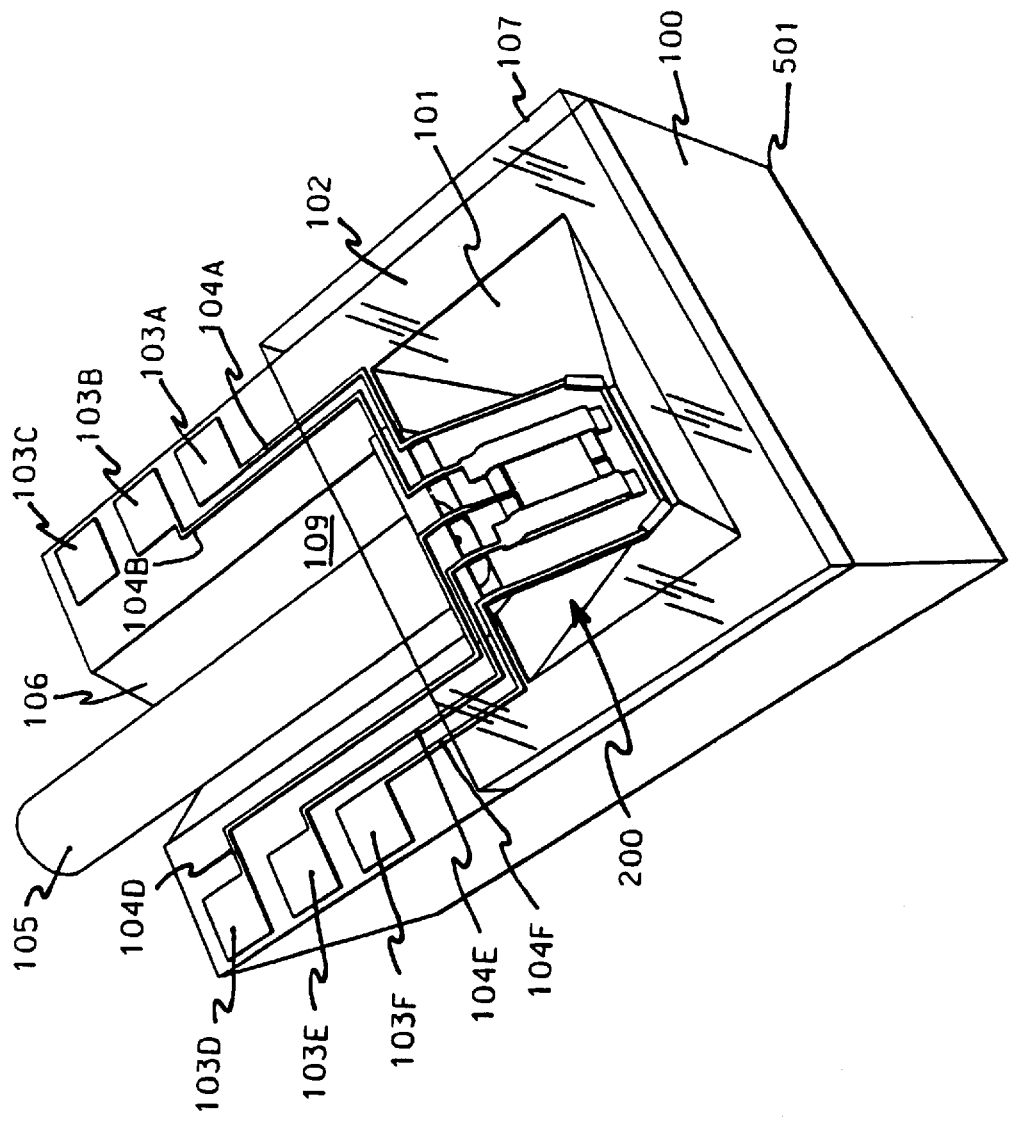
FIG. 1 is a perspective view of a hybrid fiber optic multi-degree-of-freedom beam steering apparatus according to the present invention.
Figure 2:
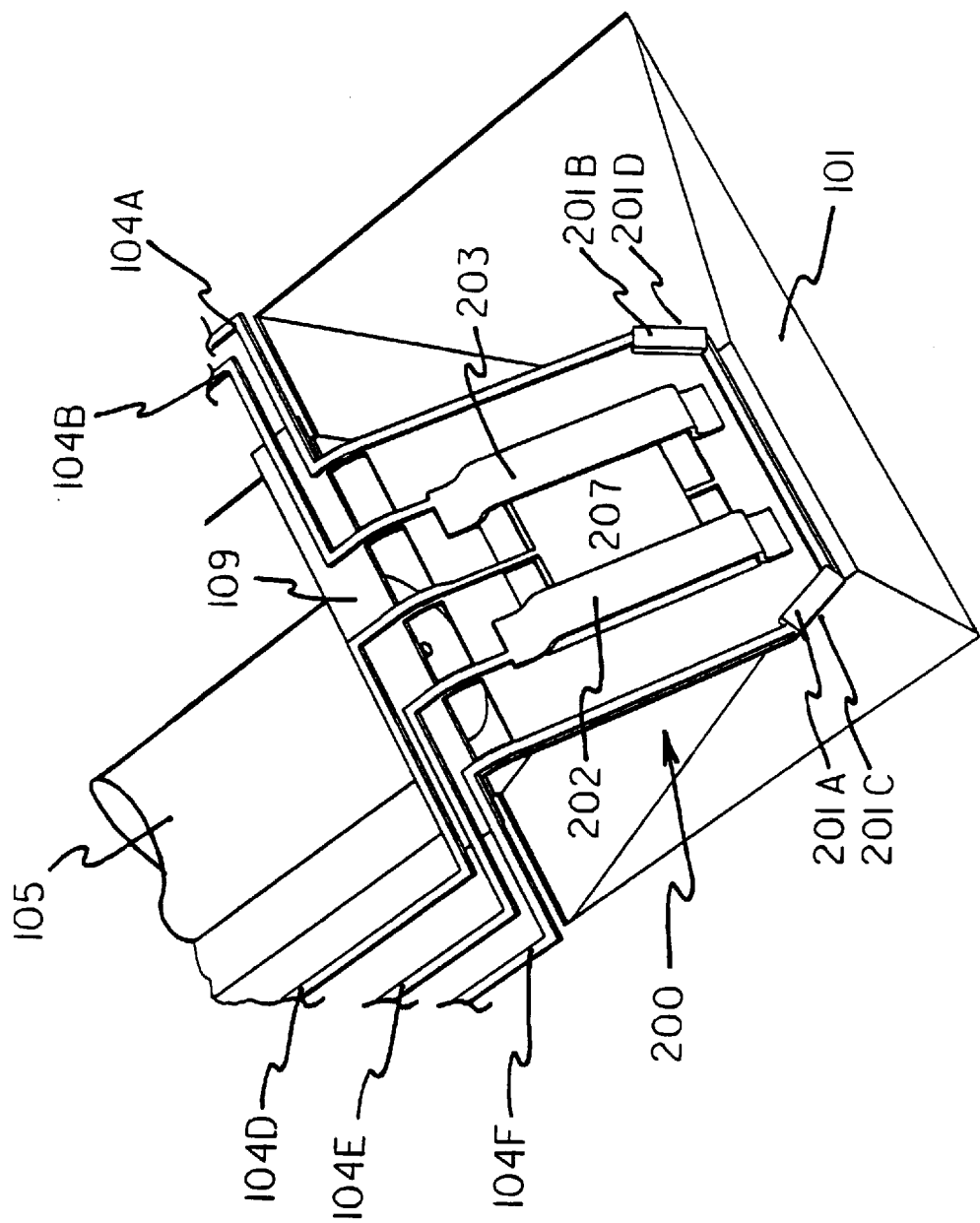
FIG. 2 is a perspective view and close up of the multi-degree-of-freedom micro-mirror shown in FIG. 1.
Figure 6:
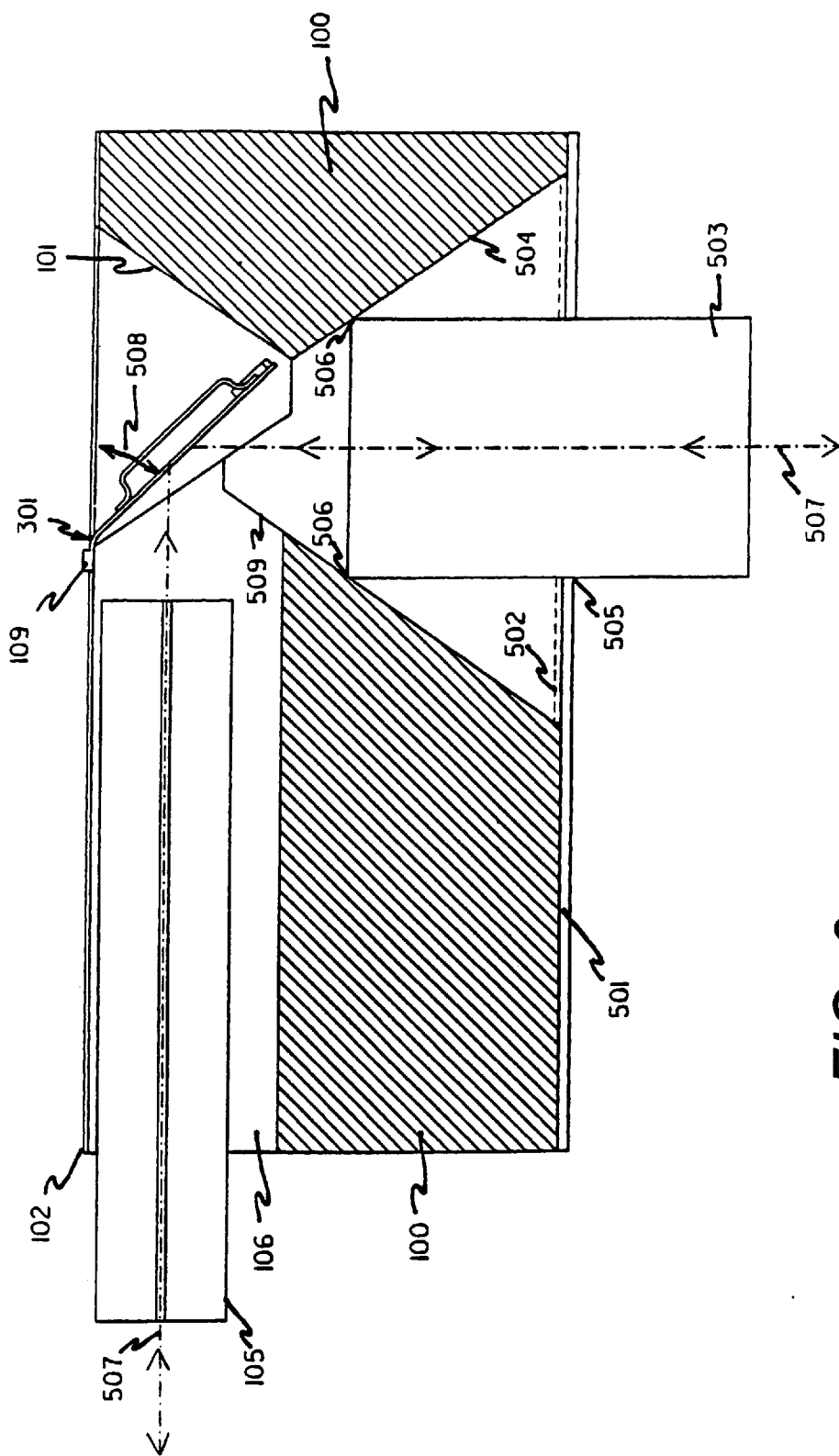
FIG. 6 is a side view cross section of FIG. 5 indicated by the section line B—B in that view.

Referring now to FIGS. 1, 2 and 6 a first aspect of the present invention provides a precision micromachined V-groove 106 into which an optical fiber 105 is cemented or otherwise affixed. A light wave propagating through optical fiber 105 is emitted from the core in the direction of micromirror assembly 200. The surface normal of micromirror assembly 200 is given a precise angle 508 and locked in place with the activation of solder bars 201A and 201B. For the configuration shown, angle 508 has a value of 45 degrees with respect to optical axis 507 as shown in FIG. 6. Upon striking the underside of submirror 207, the light wave is reflected downward through body 100 of the device. Electrodes 202 and 203 are in close proximity to submirror 207 and when a voltage potential is disproportionately introduced on one or the other electrode with respect to grounded submirror 207, an unbalanced electrostatic force is generated. The net effect of this force is to rotate submirror 207 about its torsional axis defined by torsion hinges 204A and 204B, thereby deflecting the reflected beam parallel to the bottom surface of the device and perpendicular to the axis of optical fiber 105.

The beam, having had its optical path 507 altered by submirror 207, passes down through the bottom of cavity 101 and into adjoining cavity 504 as shown in FIG. 6. In one aspect of the invention, the beam passes through the bottom of cavity 504 and into free space. In another aspect of the present invention, a circular, spherical, rectangular, cylindrical or otherwise irregularly shaped optical element 503, may be precisely positioned within cavity 504 so as to provide optical shaping of the emitted beam. For example, if a light beam traveling along optical path 507 is made to pass through optical element 503, it can be made to converge to a focal point somewhere below body 100 if optical element 503 is a converging lens, or diverge if optical element 503 is a diverging lens. Optical element 503 can take the form of a singlet lens, compound lens, achromatic lens, index gradient lens, micromachined lens or lens array, grating, prism, mirror, laser cavity, optical fiber, optical amplifier, optical sensor or any variety of optical elements known to those skilled in the art.

FIG. 1 shows one embodiment of a hybrid fiber optic multi-degree-of-freedom beam steering apparatus. The device body 100, is preferably fabricated from a conventional, double side polished silicon wafer having a normal to its surface coincident with the (100) crystallographic direction. After depositing and patterning all sacrificial SiO$_2$ pads, a thin film 102 and 501 of silicon nitride, silicon carbide, silicon monoxide or the like, is deposited on both surfaces of substrate 100, primarily to provide an inert masking layer for subsequent anisotropic etchants. A detailed account of these and other fabrication steps will be describe later. The thickness of films 102 and 501 is dictated by the pinhole free quality of the deposit but may typically be on the order of 1000 angstroms. Films 102 and 501 may be deposited using Chemical Vapor Deposition (CVD), Pressure Enhanced Chemical Vapor Deposition (PECVD), electron beam evaporation, plasma sputtering, or other methods known to those skilled in the art.

Optical fiber 105 is shown lying in a precision etched V-groove 106 which is connected to cavity 101. V-groove 106, cavity 504 and cavity 101 are all formed by a wet anisotropic etchant such as potassium hydroxide (KOH) and water, tetra-methyl ammonium hydroxide (TMAH) and water, or the like. As with all such etch profiles in silicon, the walls of groove 106 and cavity 101 are defined by the crystallographic (111) planes of silicon. This is due to the fact that there is a dramatic difference in etch rate among the different plane orientations. Specifically, for a KOH water etchant the (100):(110):(111) planes etch at a ratio of roughly 300:150:1 respectively at 85° C.

A significant aspect of utilizing the crystallographic planes of single crystal silicon to define a complex interconnection of optical fixturing is that the registration of intersecting angles from one groove or pit to the next, is governed with atomic precision. For (100) silicon, there are four (111) walls that slope down 54 degrees with respect to the top (100) surface and they intersect one another at precisely 90 degrees. Further, if a square opening of width W is made in a KOH resistant mask, such as silicon nitride, and any one side of that square opening is coincident with a (111) plane, then the resulting etched pit will have a depth of exactly 0.707 times W. Such precise control of interconnected features provides a highly reliable and relatively inexpensive method for aligning optical components with great precision.

As shown in FIG. 6, cavity 101 is connected to cavity 504 and provides clearance for movement of micromirror assembly 200. In one embodiment of the invention, cavity 101 may also play the role of a ground plane for the electrostatic actuation of one or more parts of micromirror assembly 200.

In another embodiment of the invention, groove 106 and cavity 101 may be overcoated with a solderable surface such as a sputtered titanium/platinum/gold film approximately 0.5 microns thick. The titanium provides for good adhesion between the silicon and platinum, and the platinum acts as a diffusion barrier to prevent excessive alloying of the gold and titanium and is a well know technique to those skilled in the art. A gold surface in groove 106 provides for the soldering of a metal coated optical fiber; this being but one method of reliably affixing fiber 105 into groove 106. Other methods for securing fiber 105 into groove 106 include the use of adhesives such as cyanoacrylate (3M), epoxies (MASTER BOND, 154 Hobart St. Hackensack, N.J.), photo curable adhesives (EDMUND SCIENTIFIC, 101 E. Glouc-ester Pike, Barrington, N.J.), thermoplastics (DUPONT) and the like.

Figure 7:
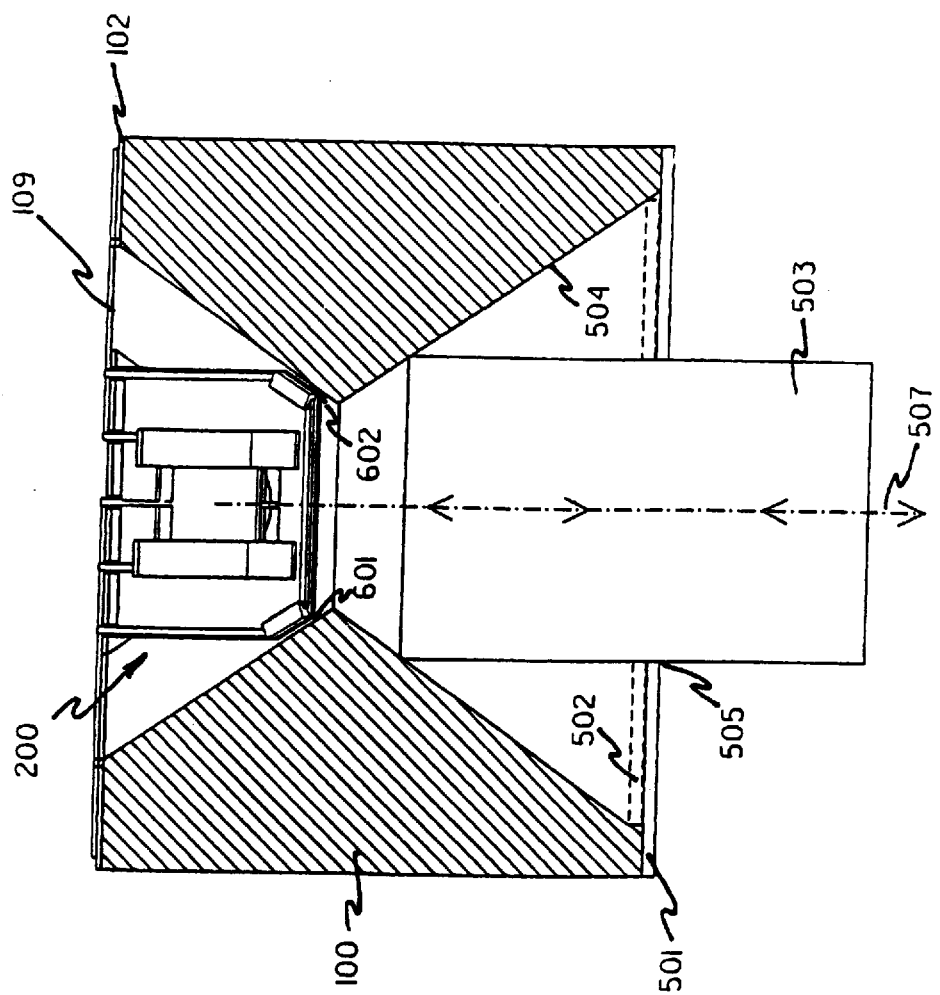
FIG. 7 is a front view cross section of FIG. 5 indicated by section line A—A in that view.
Figure 8:
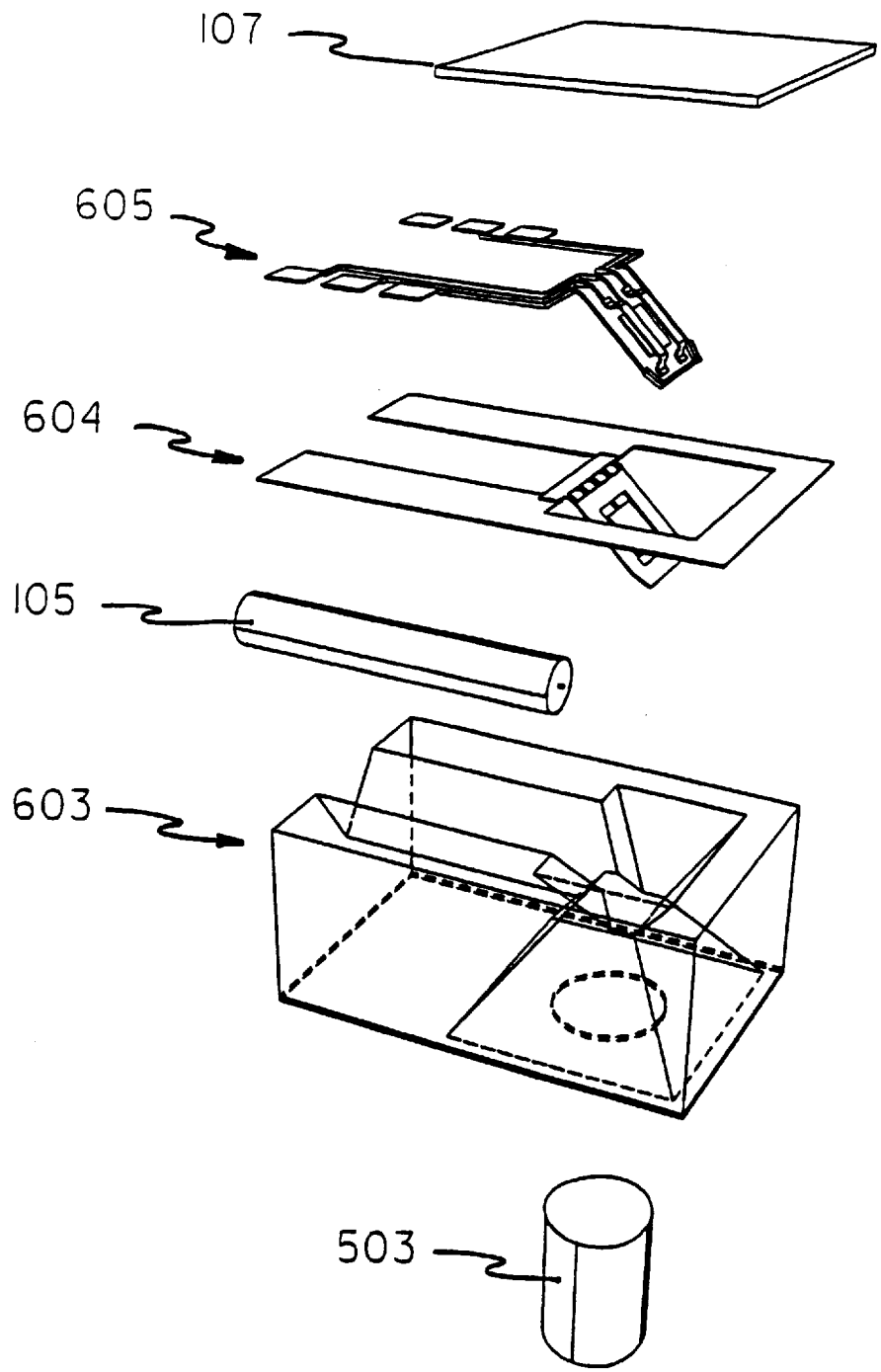
FIG. 8 is an exploded perspective view of the hybrid fiber optic multi-degree-of-freedom beam steering apparatus shown in FIG. 1.

A unique aspect of the invention involves an in situ method for assembling micromachined parts, herein referred to as the self-solder technique. Referring to FIG. 2, in one aspect of the invention, solder bars 201A and 201B are fabricated directly on resistive heating elements 201C and 201D (not shown). Heating elements 201C and 201D can take the form of a meandering path, thin film conductor (1000 angstroms), such as a Ti/Au film, whose resistance is greater than the thicker ( a few microns ) feed lines 104A and 104F. As current is passed from line 104A, through the heating elements, and out to line 104F, intense heat is conducted from heating elements 201C and 201D to solder bars 201A and 201B respectively, thereby causing them to melt. As is the case with the present invention, if solder bars 201A and 201B are in close proximity or intimate contact with a wetable surface such as a gold coated wall of cavity 101, then the molten solder will wick between wall of cavity 101 and mirror assembly 200 at the point of solder joint contact. These contact points are shown as 601 and 602 in FIG. 7. Removing current flow from 104A and 104F disengages the heaters and permits the joint to solidify. The resulting solder joint is permanent and strong.

Solder bars 201A and 201B can be composed from a wide range of materials with a range or melting points from room temperature to 500° C., depending on the desired strength of the resulting solder joint and range of service temperatures. A higher melting point solder usually results in a stronger joint. Solder composition can be any variety of commonly known low temperature alloys such as PbSn, PbSbSn, PbSnAg, In, or higher melting point alloys composed of Sn, Ag, Au, Cu, Si etc. These materials may be obtained from companies such as the INDIUM CORPORATION OF AMERICA (34 Robinson Rd, Clinton N.Y.) or TECHNICS (1254 Alma Ct. San Jose, Calif.). Solder bars 201A and 201B may be formed by electroplating in the case of the Pb and In alloys, or may also be sputtered and patterned in the conventional manner as is known by those skilled in the art. It can be appreciated that it may also be desirable to incorporate a layer of flux on or within solder bars 201A and 201B to enhance the wetability of the joined surfaces.

A low temperature self-soldering joint can be created by making solder bars 201A and 201B from any of a variety of low melting point thermoplastics such as polyester resins, microcrystalline wax, polyethylene and the like. A large variety of thermoplastic adhesive resins are available from DUPONT.

It is well known that gold alloys quite readily with silicon at low (400° C.) temperatures, forming an excellent silicide. Given sufficient heat input, it may be possible to use pure gold, or a eutectic gold/silicon solder (96.8% Au, 3.2% Si) to produce a bond directly on a bare silicon surface, thereby simplifying the self-solder technique.

In an alternate embodiment of the invention, it may be desirable to eliminate lines 104A and 104F and resistive heating elements 201C and 201D in lieu of placing the entire device on a hot plate or in an oven to directly activate solder bars 201A and 201B. It can be appreciated that any one of these method of self-soldering described in the preceding paragraphs, could also be used to secure fiber 105 into groove 106, or optical element 503 into cavity 504.

Bar 109 provides support for bond pads 103A–103F and corresponding conducting lines 104A–104F as they traverse the underetched void created by groove 106. Bar 109 may be composed of a particularly thick layer of insulating material similar to that which makes up micromirror assembly 200. Another method for fabricating bar 109 would involve the plating of a metal such as Fe, Ni, Cu, Au or Cr that is subsequently overcoated with an insulator such as $Si_xN_y$, $Sio_2$, SiC or the like.

For the embodiment shown in FIGS. 1 through 8, a light beam approaches submirror 207 from below, thus a reflective material must be provided on the lower surface if the body of submirror 207 is comprised of an opaque dielectric. If a thin or otherwise transparent dielectric such as silicon nitride is used, then the reflective surface may be encapsulated within the body or reside on the upper surface of the mirror.

A major advantage of the fabrication means disclosed herein, is that the critical reflective surface of a mirror may be sputtered directly on the surface of a freshly polished wafer, before any additive processing has been done. Because this is done first, mirrors are optically flat and smooth, and global planarization is not an issues.

Figure 4:
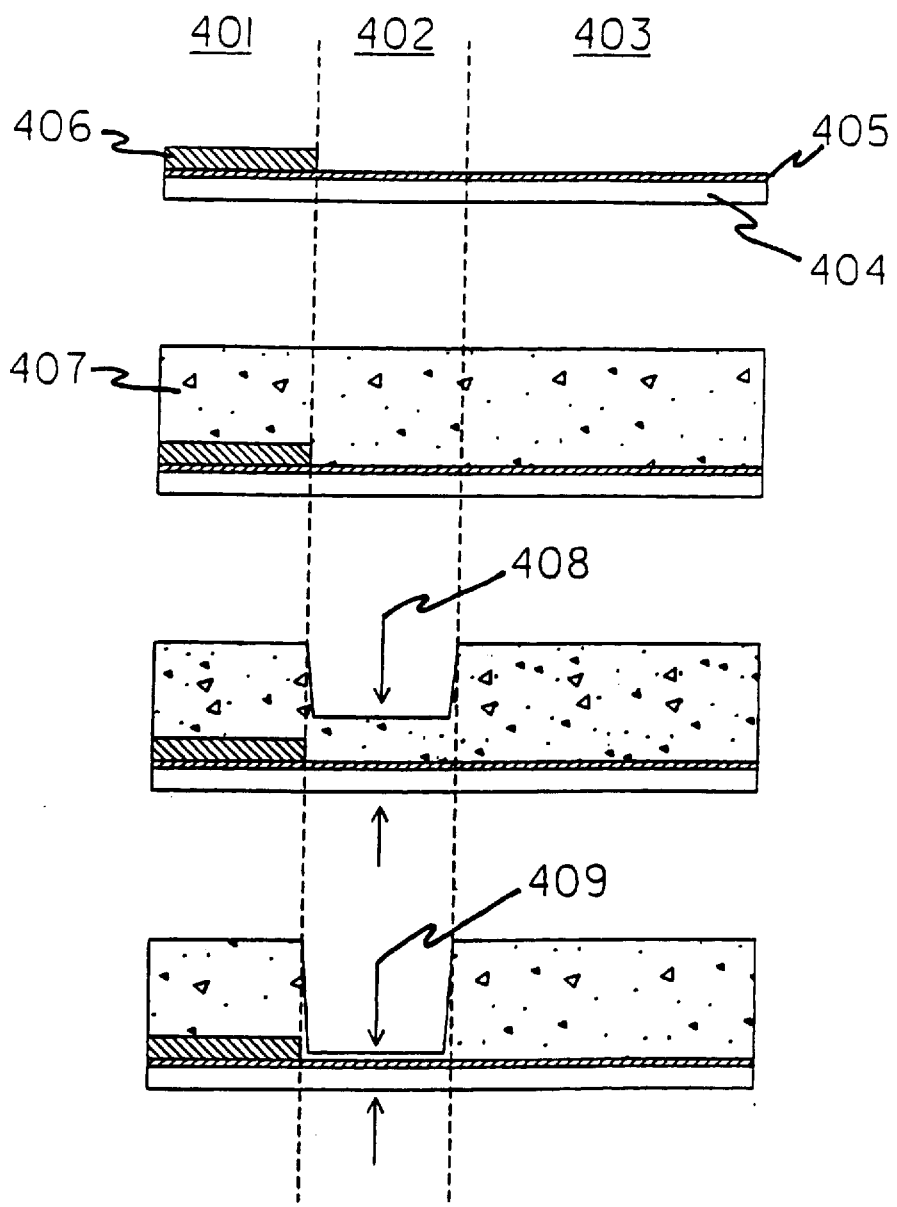
FIG. 4 is a side view cross section showing the internal detail of either a torsion or cantilever hinge.
Figure 5:
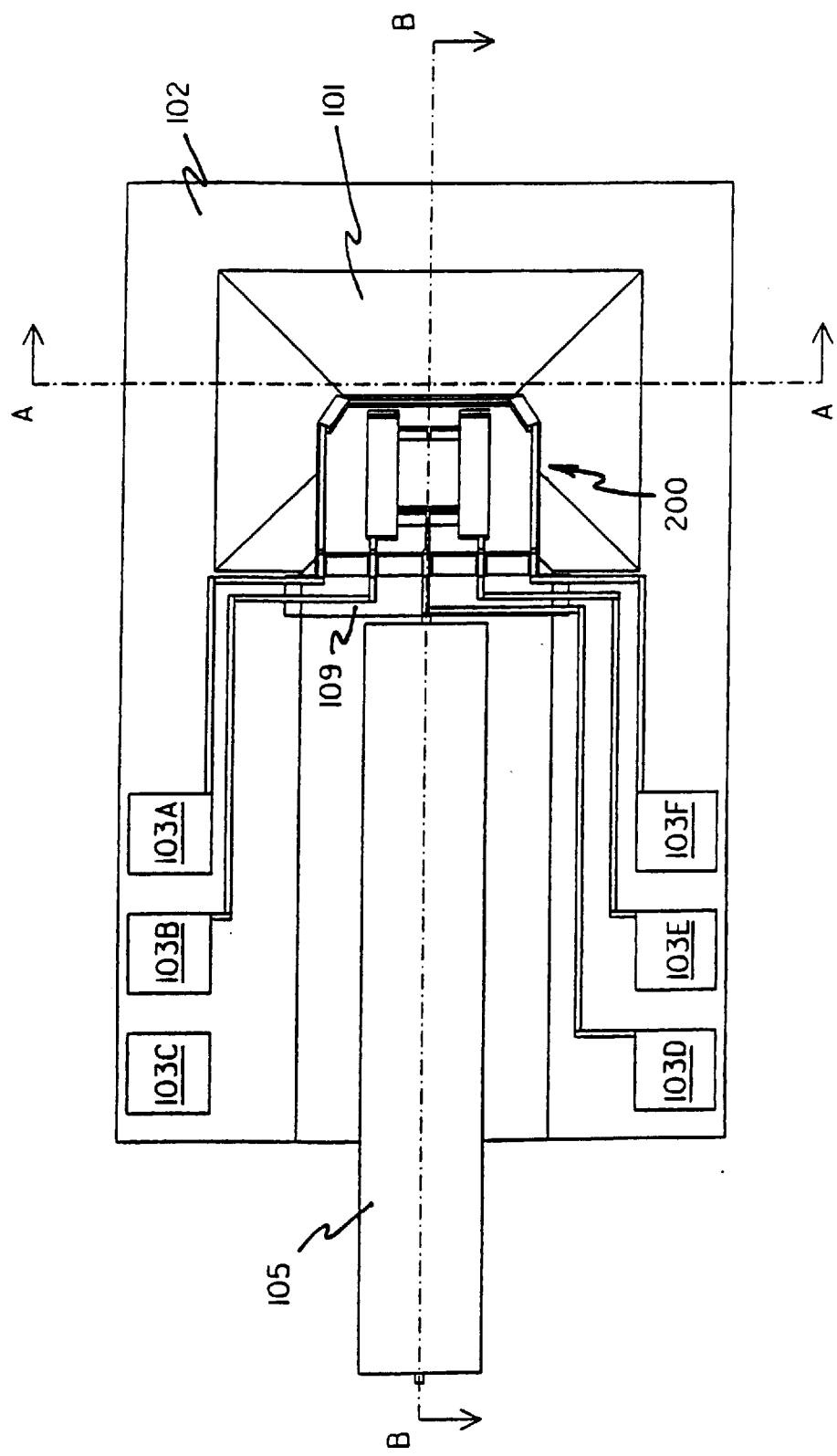
FIG. 5 is a top view of FIG. 1.

Details of the hinge structure employed for both torsion and cantilever hinges is shown in FIG. 4. Area 401 refers to the anchored or frame side of hinge 402, while area 403 refers to the mirror or suspended side of the structure. As shown here, conductor 405 traverses hinge 402 and is made as thin as possible so as not to significantly contribute to hinge stiffness. Via pad 406 is in communication with layer 405 and built up to prevent punch through as a plasma etched via is made through layer 407. Thicker lines may then be connected to via pad 406. In general, via pad 406 may be on either side of a hinge structure. In the preferred embodiment, a via pad 406 resides on both sides of a hinge structure for all lines since thicker, high current carrying lines are present on the cantilevered structure side.

Figure 3:
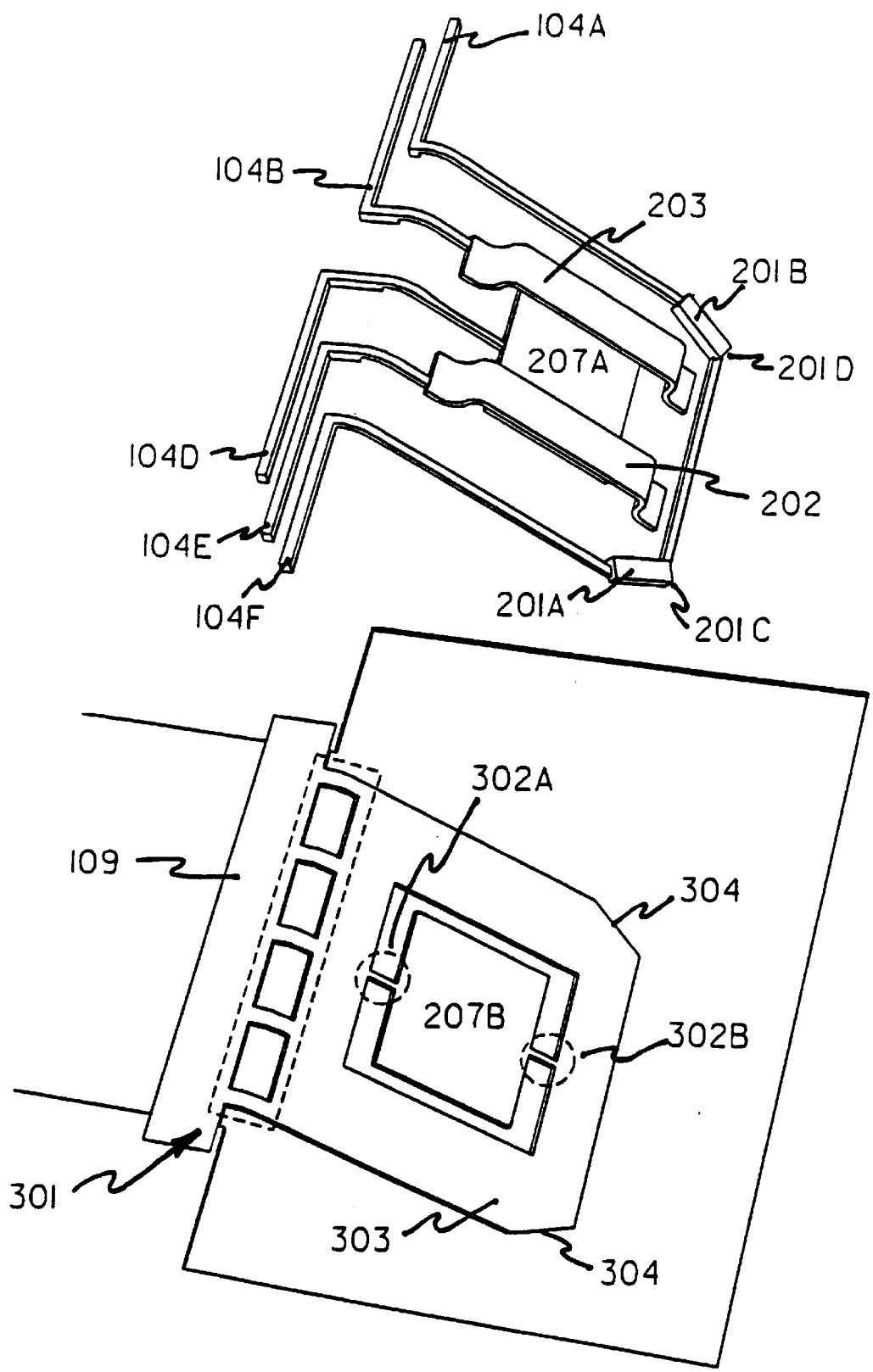
FIG. 3 is an exploded perspective view of FIG. 2 showing the details of the multi-degree-of-freedom micro-mirror.

A general, presently preferred fabrication sequence for micromirror assembly 200 is as follows. Referring to FIGS. 3 and 4, first, a thin (400 A) layer 404 of low stress LPCVD silicon nitride is deposited over the upper surface of substrate 100.

Next, a conducting layer 405 of Ti (100 A) / Au (400 A) / Ti (100 A) is sputtered or evaporated onto the surface. Layer 405 is patterned with a photoresist mask and a combination of 6:1 BOE to etch the Ti, and room temperature aqua regia (3:1 HCl/HNO3) to etch the Au. All via pads 406, may be built up by selectively electroplating these areas.

A thicker layer 407 (i.e. 2 microns for a mirror 100 microns wide) of low stress, low temperature PECVD silicon nitride is deposited over the surface. A second mask is then provided such that there are openings defining those areas that will be etched down to bare substrate 100. Specifically, those are areas that define the edges of mirror frame 303, submirror 207, torsion hinges 302A and 302B, side wall accommodating edges 304, the area between micromirror assembly 200 and the defining edges of cavity 101, and cantilever hinge perforations shown as hinge group 301 in FIG. 3. For reasons to be discussed later, a plasma etch of only 3000 A is performed at this point, and is herein refereed to as the "head start" etch.

After the old mask is removed, a third mask is provided having openings as previously described, but with additional opening over all hinge areas. A plasma etch is done such that layer 407 is removed from all areas that will see a subsequent Si anisotropic etch.

This leaves a substantially thick hinge area 408, that is approximately equal to the thickness of the "head start" etch.

A forth mask defines via openings down to all via pads 406. A plasma etch is performed until all pads 406 are exposed.

A sacrificial material (not shown) such as polyimide, PMMA, SiO2 or the like, is deposited and patterned with a fifth mask to form a pad above and about submirror 207 and extends laterally to cover those openings that define submirror 207 while remaining within the bounds of frame 303 and not covering pads 406. The thickness of this sacrificial pad defines the electrode spacing between submirror 207 and electrodes 202 and 203.

A seed layer of Ti (200 A), Au (1500 A), Ti (500 A) is deposited onto the substrate. A sixth mask is provided, with openings defining lines 104A–F and electrodes 202 and 203. The upper layer of Ti is removed with BOE, thereby exposing the Au. Au is then electroplated within the open mask areas. After stripping of the mask, the seed layer is removed with wet etchants as before.

A similar series of procedures may be used to define thin film heaters 201C and 201D and to electroplate or pattern the optional solder bars 201A and 201B.

After electroplating, all sacrificial materials are removed. If polyimide is used, then a three Torr oxygen plasma is used to remove it. If SiO2 is used, then an extended length BOE wet etch is employed.

The bare areas of substrate 100 are then subject to an 85° C., 25% KOH:DI etch. As cavity 101 is defined by the anisotropic etch, micromirror assembly 200 becomes fully under etched and is suspended above the cavity by hinge group 301. Post etch debris is removed with a 10 minute immersion in 1:1:1 HCl:H$_2$O$_2$:DI followed by a DI rinse.

As previously mentioned, the cross section 408 of hinge group 301 is relatively thick. A thick cross section produces a very stiff hinge structure, thereby preventing the well know destructive force of surface tension from pulling micromirror assembly 200 into hard contact with the walls of cavity 101, a condition that is irreversible.

An overly stiff hinge, however, is undesirable for creating large angular deflections with moderate driving voltages. Thus, all hinges require a dry etch "tuning" to a cross sectional thickness 409 before being called into service. Depending on the thickness of layers 404 and 405, a hinge can be made arbitrarily thin and compliant. Because the final etch takes place in a dry environment, there is no danger of surface tension induced damage.

Once completed, micromirror assembly 200 is electrostatically driven down into cavity 101 by placing a potential across pads 103C and 103D. At a sufficient voltage, edges 304 of micromirror assembly 200 will rest against the side walls of cavity 101. The predetermined geometry of micromirror assembly 200 and cavity 101 is such that when fully deployed to contact, micromirror assembly 200 will rest at a 45 degree angle with respect to the upper surface substrate 100. While maintaining the voltage, current is momentarily driven through pads 104A and 104F to initiate the self soldering means, thereby firmly establishing micromirror assembly 200 within cavity 101.

It can be appreciated that the fabrication sequence previously suggested, can be altered significantly while attaining the same objectives. Thus, any permutations of sequencing are considered equivalent methods. In addition, other techniques such as plasma etching of the conductive layer, replacing dry etches with wet etches, and other substitutions known to those skilled in the art, are essentially equivalent methods to those already disclosed.

Once deployed, a transparent or opaque cover plate 107, made from glass, ceramic, plastic, silicon etc., serves as a mechanically rigid barrier to prevent inadvertent damage of the delicate micromirror assembly 200. Cover plate 107 may be attached to body 100 with methods commonly in use today including, solder glass, glass frit, two part adhesives, thermal adhesive, UV cure adhesives, cyanoacrylate, etc. In order to reduce possible electrostatic interference with or to the environment, cover plate 107 may also have one or more surfaces coated with a conductor, or may itself, be electrically conductive. If 107 is made conductive, it is apparent that it could provide the necessary ground for rotating submirror 207 in lieu of electrodes 202 and 203. In this configuration, two isolated conducting surfaces disposed on either side of the rotational axes defined by hinges 302A and 302B on submirror 207, could produce an unbalanced electrostatic force by applying a voltage potential between one or the other of the conducting surfaces and the grounded surface of cover 107. Similarly, torsional forces can be produced between cavity 101 and the isolated conducting surfaces of submirror 207, as described previously, if cover 107 is made non-conductive or is electrically isolated and cavity 101 is grounded.

Cavity 504 is formed on the underside of body 100 in a five step process. First, sacrificial pad 502, preferably composed of SiO$_2$, is deposited (approximately 0.5 microns thick) and patterned on the bottom surface of body 100. Secondly, a thick (1000 A to a few microns ) underside cap layer 501 of Si$_x$N$_y$, SiC or any other material that shows excellent resistance to Hydrofluoric Acid (HF) or Buffered Oxide Etch (BOE), is deposited over the bottom surface of body 100, thereby covering sacrificial pad 502. A hole 505 is then etched through underside cap 501 and sacrificial pad 502 down to bare silicon, preferably with a fluorinated, high frequency plasma as is typically the case for these materials. The shape of hole 505, be it round, square or irregular, is such that it will accommodate the insertion of optical element 503. Next, hole 505 is subjected to a wet BOE or HF dip until sacrificial pad 502 is completely consumed. This process can extend from minutes to hours, depending on acid concentration and the size of sacrificial pad 502.

Typically, for 6:1 BOE, $SiO_2$ will etch at a rate of approximately 4000 A per minute. Finally, a KOH etch is performed that will form cavity 504. The lateral extent and depth of cavity 504 is defined by the initial (100) surface area exposed to the KOH etchant, which is precisely the surface area previously occupied by sacrificial pad 502.

Subsequent to the formation of cavity 504, the bare silicon walls are exposed to a high temperature oxygen or steam atmosphere, thereby forming a thermal $SiO_2$ layer. This step is required to prevent irregular etching in the (110) direction at the geometrically complex intersection of cavity 101 and cavity 564, identified as 509 in FIG. 6.

Upon assembly, optical element 503 is inserted into hole 505 until its upper edges come into contact with the walls of cavity 504. The points of contact between optical element 503, cavity 504, and underside cap 501 define a mechanically over-constrained system that will, in most cases, insure alignment of optical element 503's optical axis with the surface normal of body 100. The precision with which the center of optical element 503 is aligned with the center of micromirror assembly 200 is defined by the front-to-back alignment errors of the photolithographic aligner used. With very little difficulty, this error is typically less than a few microns. Once optical element 503 is inserted, it may be externally cemented in place using the self solder technique or with more conventional adhesives such as cyanoacrylates, thermoplastics, two part epoxies, UV cure adhesives, etc.

Figure 9:
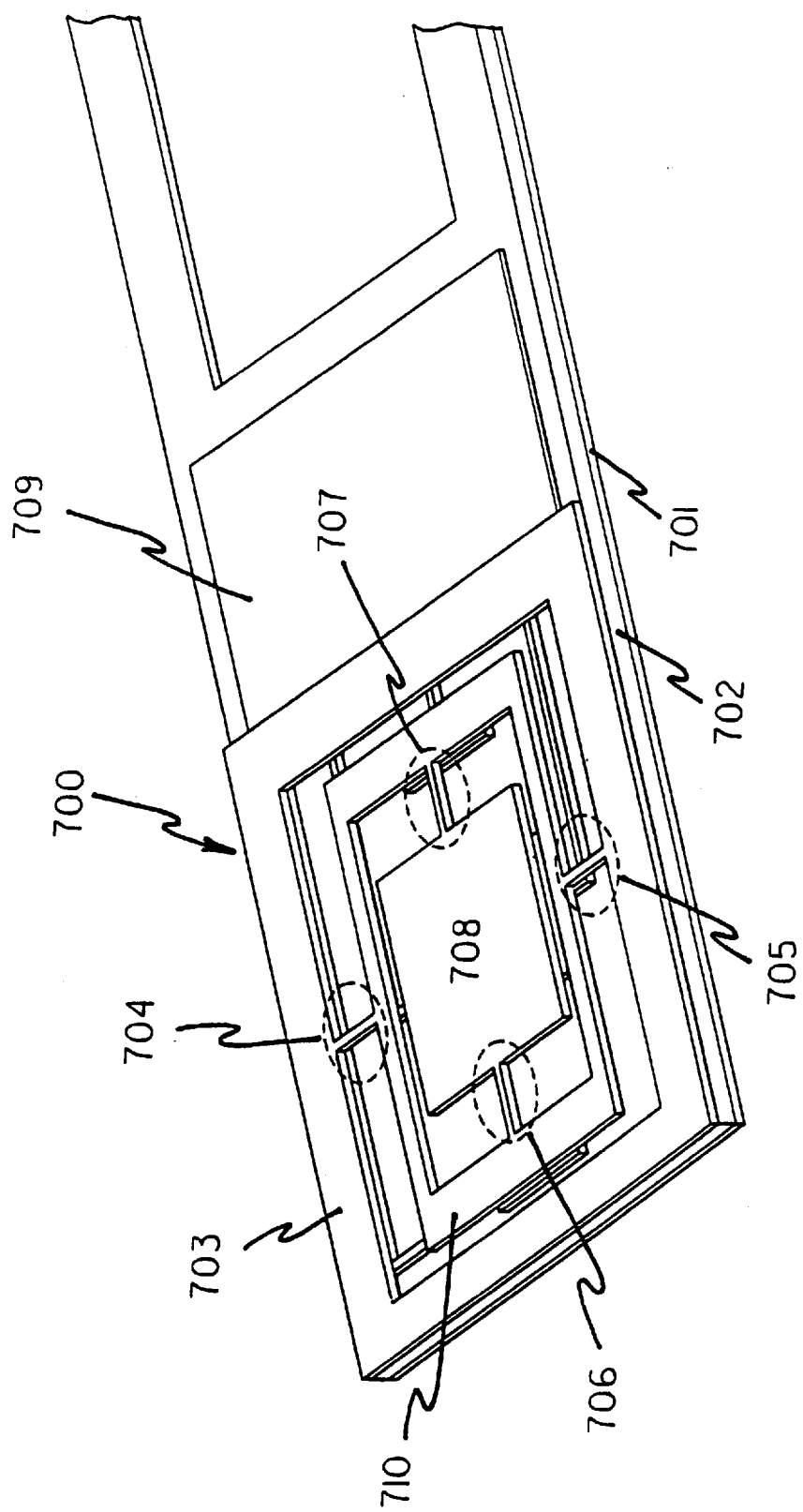
FIG. 9 is perspective view of a generalized double gimbaled micromirror.
Figure 10:
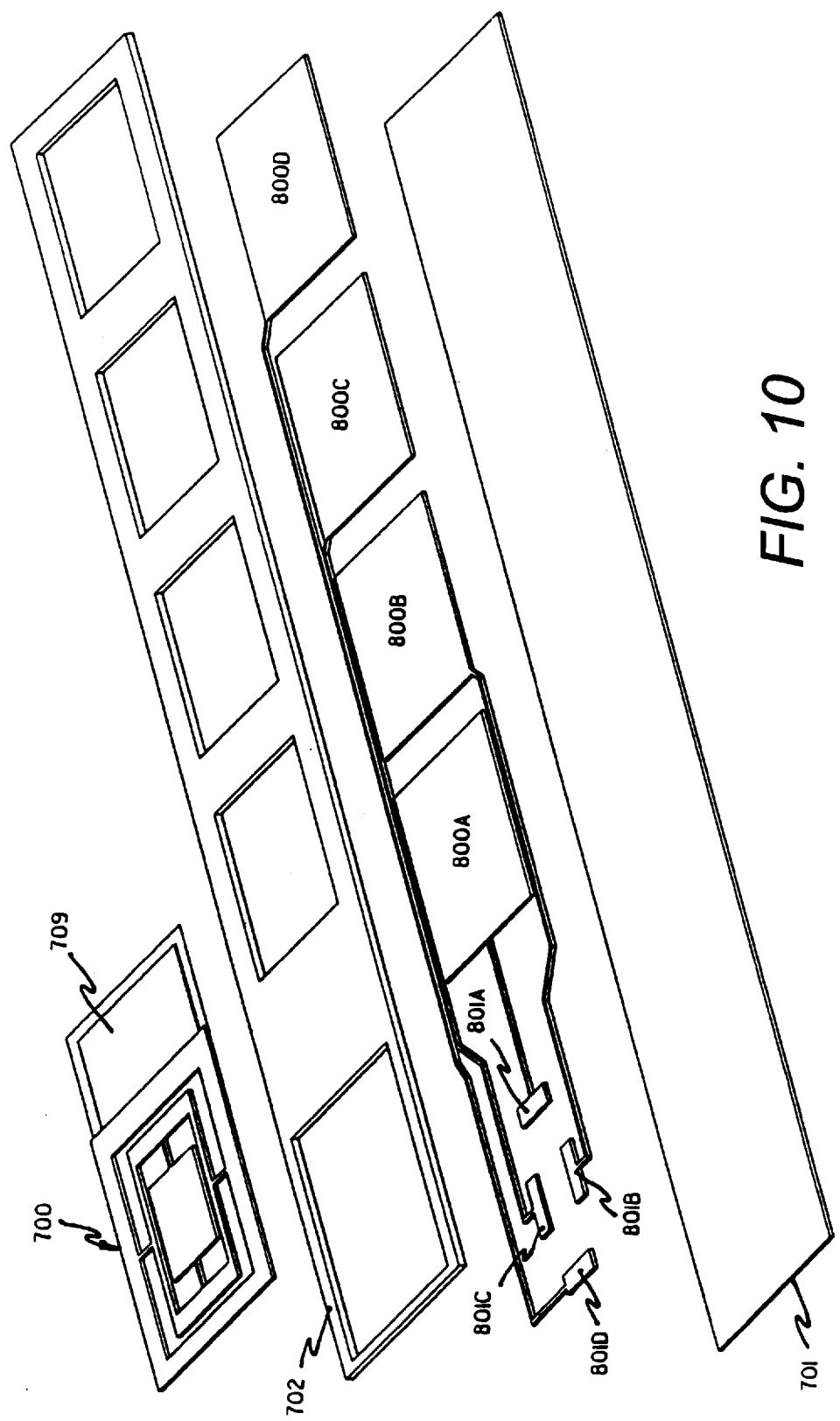
FIG. 10 is an exploded perspective view of FIG. 9.

An alternate embodiment of micromirror assembly 200 is shown in FIGS. 9 and 10. The double gimbaled configuration of micromirror 708 permits rotation about two perpendicular axes defined by gimbaled hinges 704, and 705 on one axes and gimbaled hinges 706, and 707 on the other axes. Electrostatic forces are produced by grounding micromirror 708 and surrounding frame 710 through bonding pad 709, while selectively charging one or more of electrostatic pads 801A, 801B, 801C, and 801D directly below. Electrical isolation between conducting layers is maintained by insulating layer 702. Insulator 702 provides electrical isolation from the environment. The electrostatic attractive forces acting between electrostatic pads 801A and 801D, and frame 710, or between electrostatic pads 801B and 801C, and the edges of micromirror 708, produce the desired rotation. Electrostatic pads 801A, 801B, 801C, and 801D are electrically connected to bonding pads 800A, 800B, 800C, and 800D respectively.

Within the rotational travel limits defined by the geometry of double gimbaled micromirror 700, any simultaneous combination of rotations about two axes is possible. For example, if frame 710 and micromirror 708 are each geometrically constrained to plus or minus 20 degrees of rotation, double gimbaled micromirror 700 would have the capability to deflect an impinging light beam in any direction within a cone of 80 degrees.

It can be appreciated that electrostatic pads 801A, 801B, 801C, and 801D could also be disposed above and around micromirror 708 and frame 710 as in micromirror assembly 200, provided the reflective surface of the central mirror is sufficiently unobstructed. It is apparent that a gimbaled micromirror assembly with one or more axes of rotation is essentially an extension of this general case. Micromirror assembly 200 is an example of a single degree of freedom, or single axes embodiment of this general case. Double gimbaled micromirror 700, as shown in FIG. 10, can also be used in a stand alone implementation.

In another embodiment, double gimbaled micromirror 700 is modified to include cantilever hinges. The resulting two axis micromirror assembly, labeled 900 in FIG. 11, can controllably alter the path of a light beam emitted by optical fiber 105 in two directions about a vector normal to the surface of substrate 100. In this implementation, an impinging beam strikes the upper surface of the mirror assembly. Since the reflective medium must be on the upper surface, a change in the order of fabrication steps is required as would be apparent to someone skilled in the art. It is also noted that for all mirror configurations, a multi-layer dielectric will also provide an excellent reflective surface.

Figure 11:
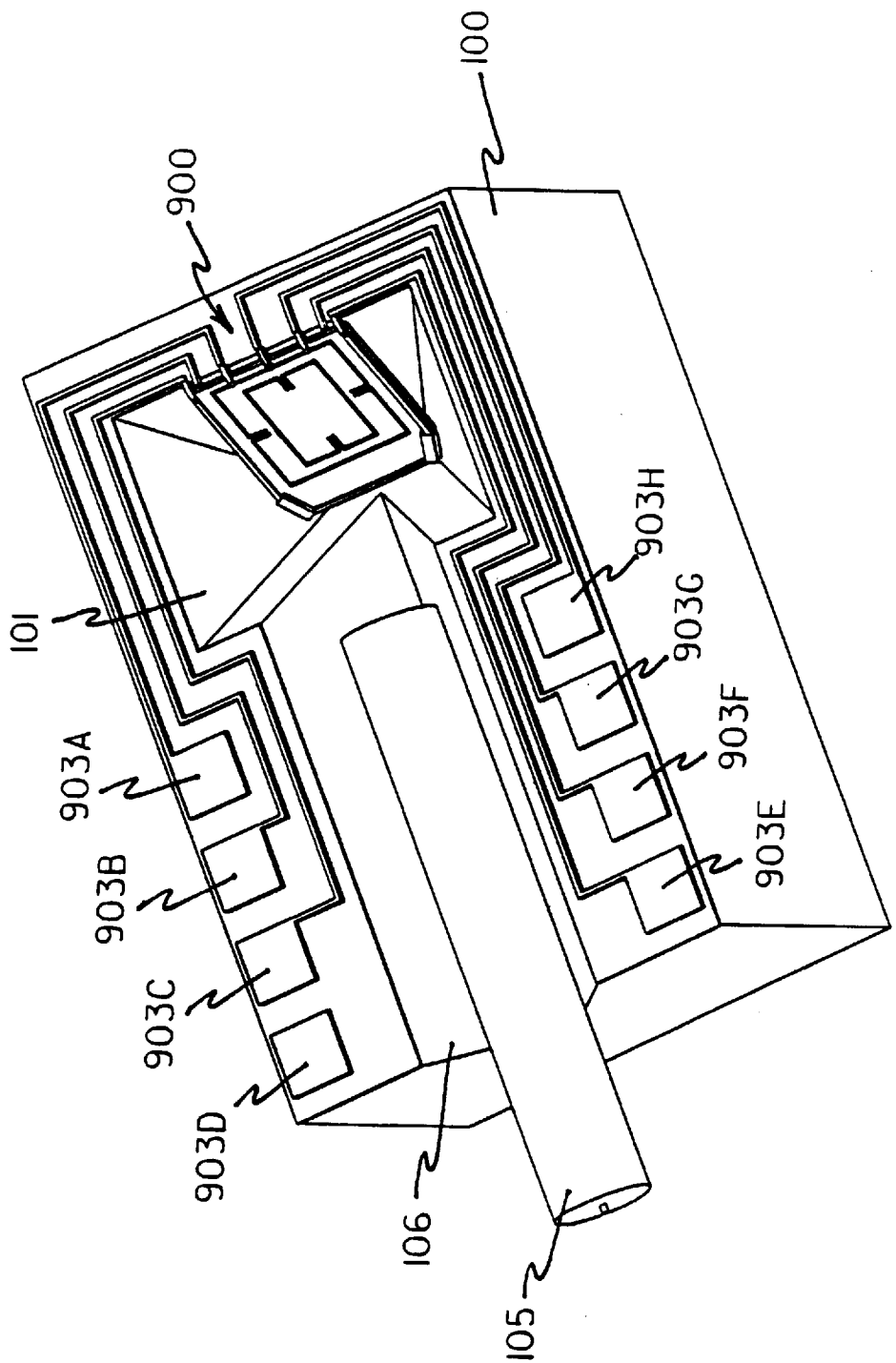
FIG. 11 is a perspective view of an alternate embodiment

Due to an extra axis of motion, the apparatus of FIG. 11 requires two additional electric lines and pads over those present in the preferred configuration. Pads 903C and 903E are in communication with a self solder means. Pad 903H is in communication with the conductive surface of micromirror assembly 900. Pad 903D makes an electrical contact with substrate 100, while pads 903A, 903B, 903F and 903G are in communication with electrodes (not shown) disposed beneath the double gimbaled micromirror as with double gimbaled micromirror 700.

Figure 13:
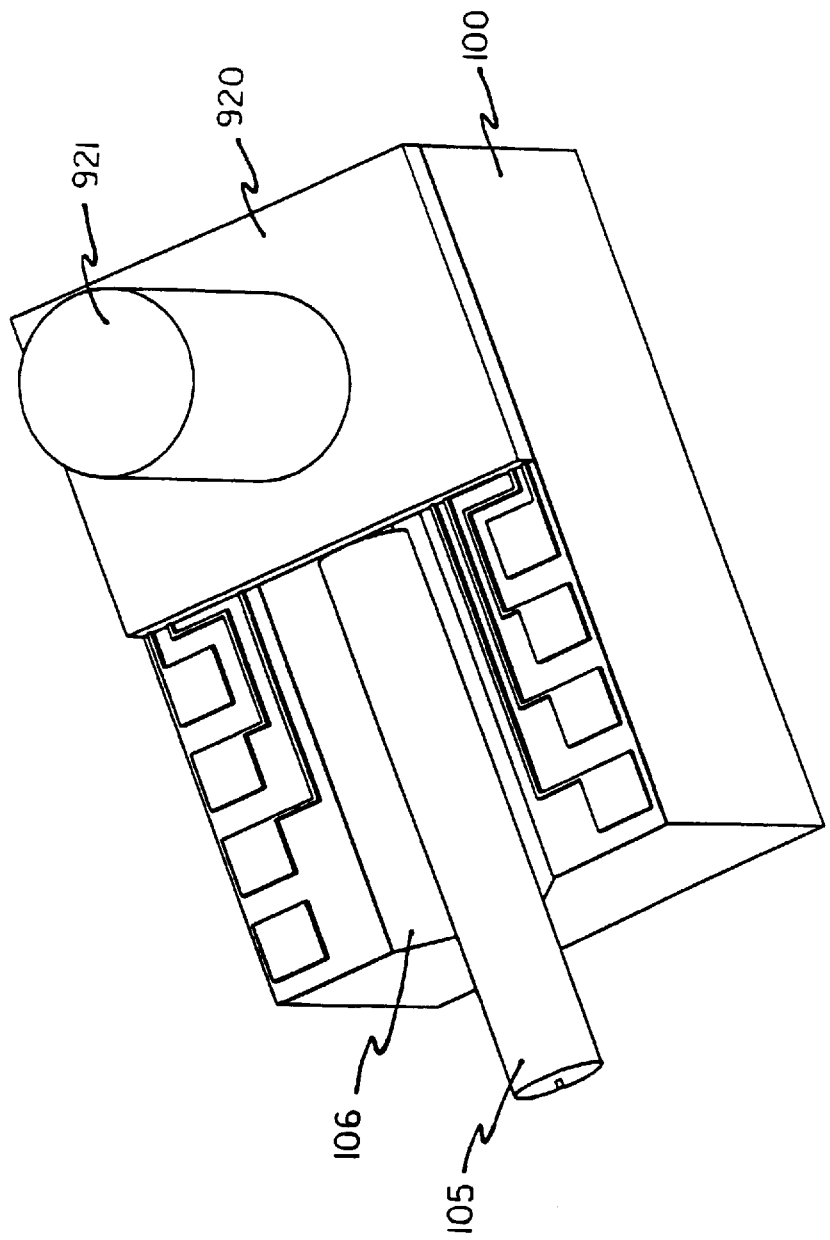
FIG. 13 is a perspective view of an alternate embodiment with an integral optical device and cover plate

If optical modification of the beam is required, then a second optical element 921 can be introduced as shown in FIG. 13. In this embodiment, optical element 921 is bonded to a transparent cover plate 920. Cover plate 920 serves many functions. Using solder glass, adhesives, or the like, one can hermetically seal cavity 101, intersecting groove 106, and the voids surrounding optical fiber 105 with cover plate 920. Such a seal would protect the delicate beam steering means below from the harshest of environments. In addition, cover plate 920 provides a convenient means for mounting optics, and providing a positive stop for positioning optical fiber 105 along groove 106, given a sufficiently large fiber diameter.

Figure 12:
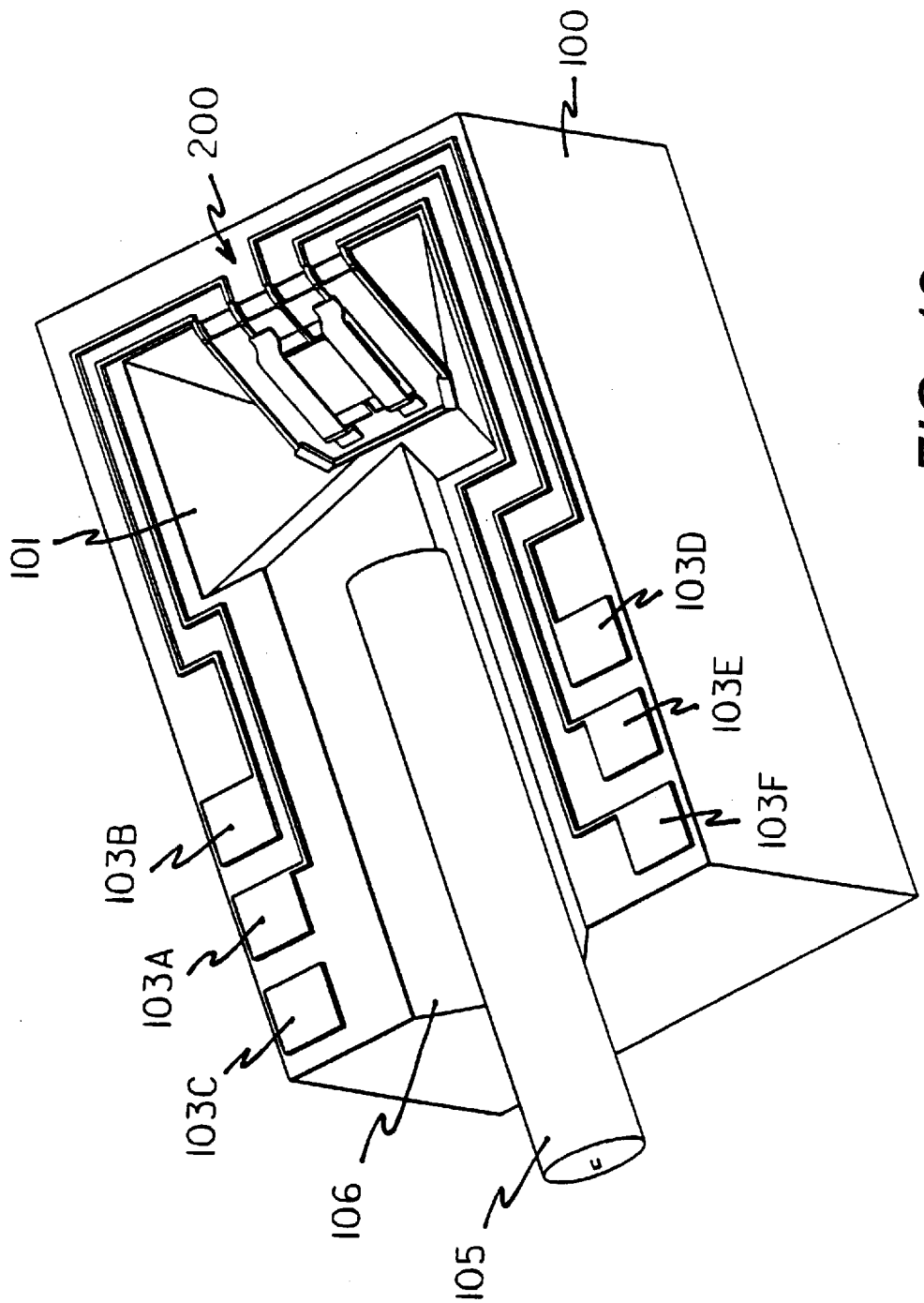
FIG. 12 is a perspective view of another alternate embodiment

Yet another embodiment of a beam steering device is shown in FIG. 12. It is functionally similar to the device in FIG. 11 with the notable exception of employing a single axes beam steering means such as micromirror assembly 200. The pad functions and names are identical to the preferred embodiment. This apparatus can also be sealed with a cover plate and use additional optics as with the previous embodiment.

Figure 14:
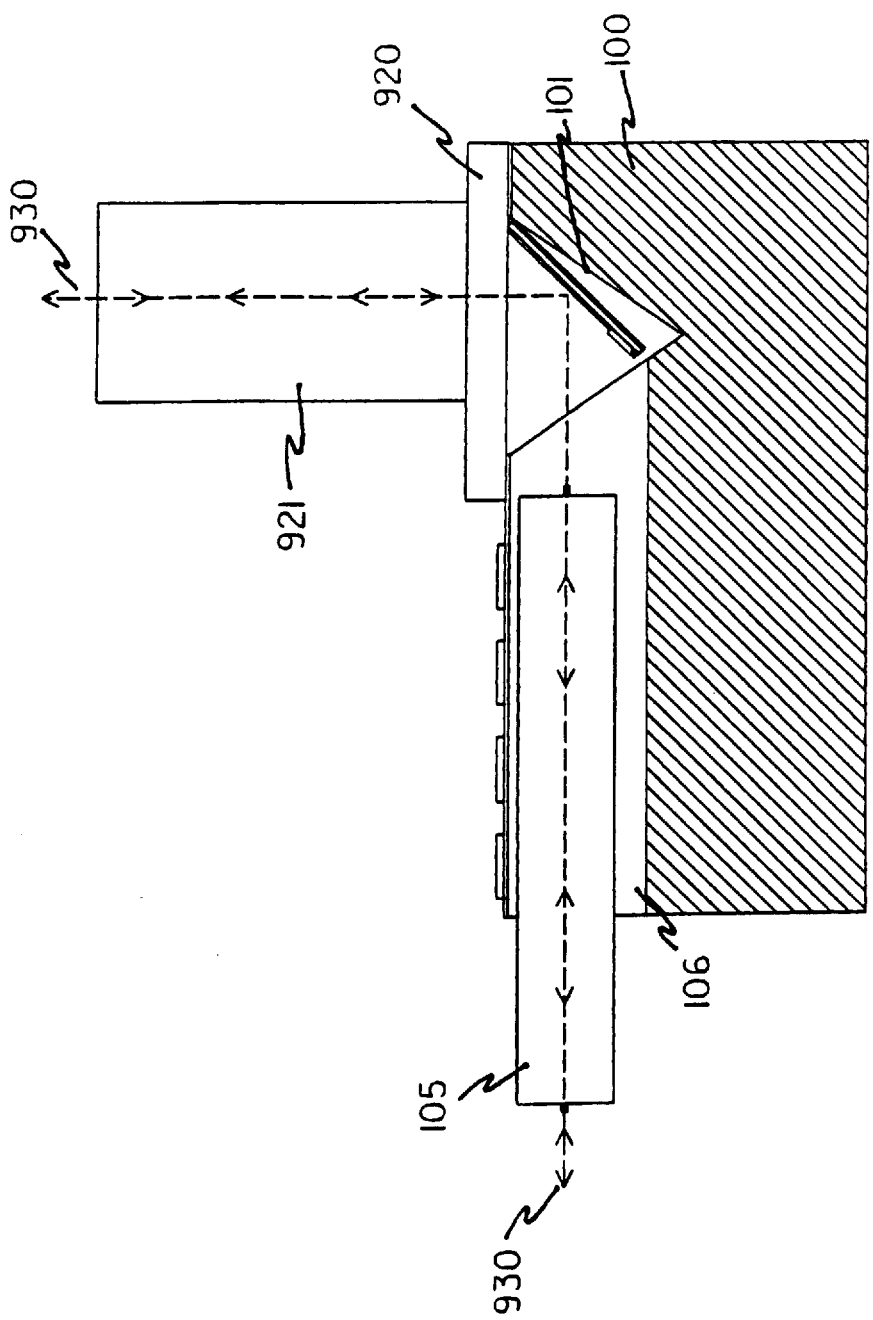
FIG. 14 is a side view cross section of FIG. 13

FIG. 14 shows a cross sectional view of the embodiments shown in FIGS. 11 and 12. Optical path 930 can be traversed in either direction. Many applications of this technology require only a forward propagating optical path, from optical fiber 105 to secondary optical element 921. For example, any of the embodiments discussed could be used as the printing engine in a high speed laser printer, a photographic emulsions laser plotter, a laser mask writing tool, a steerable industrial laser cutting device, or a pen based, full wall laser display to name a few. By fabricating three such devices side-by-side and supplying each with a different color light, a pen based, full wall color display can be envisioned.

A bidirectional optical path can be utilized in applications such as optical switches, industrial robot vision scanners, illuminating and reading from optical drives such as a CD ROM, illuminating and scanning in an optical microscope configuration, and illuminating and reading bar codes. Of course, two devices could be fabricated together where one transmits the optical signal and the other receives it as with laser range finders or optical proximity detectors.

Although these single sided embodiments lack the convenient self alignment feature provided by lower cavity 504 and alignment means 505, they would most likely be less costly to manufacture due to the single sided photolithographic steps.

Figure 15:
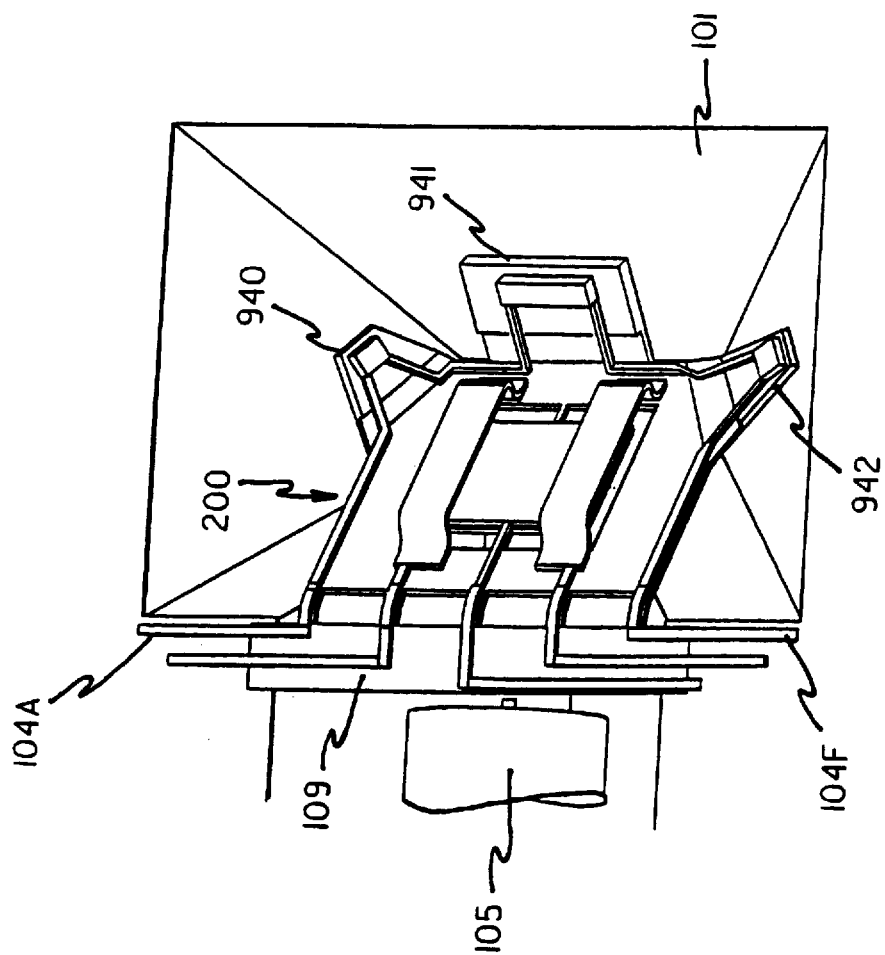
FIG. 15 is a perspective view of FIG. 1 showing a distal and lateral flap locking means

FIGS. 14 and 15 show two more ways in which a beam steering means can be locked into position within cavity 101. In FIG. 15, one or more lateral flaps 940, 942, or distal flap 941 are fabricated in conjunction with micromirror assembly 200, and are connected to micromirror assembly 200 via a cantilever hinge structure already discussed. The flaps may be equipped with a self solder means.

During deployment of micromirror assembly 200, flaps 940, 942 and 941 provide an added measure of resistance as they encounter the walls of cavity 101 on their way down. As contact is made, the cantilever flap hinges (not shown) deflect, allowing the flaps to conform to the slop of the walls within cavity 101. The resulting drag adds stability to the deployment process so that any angle between contact and full deployment can be attained. As with the preferred embodiment, once micromirror assembly 200 is at the desired angle, the self soldering means is activated.

Figure 16:
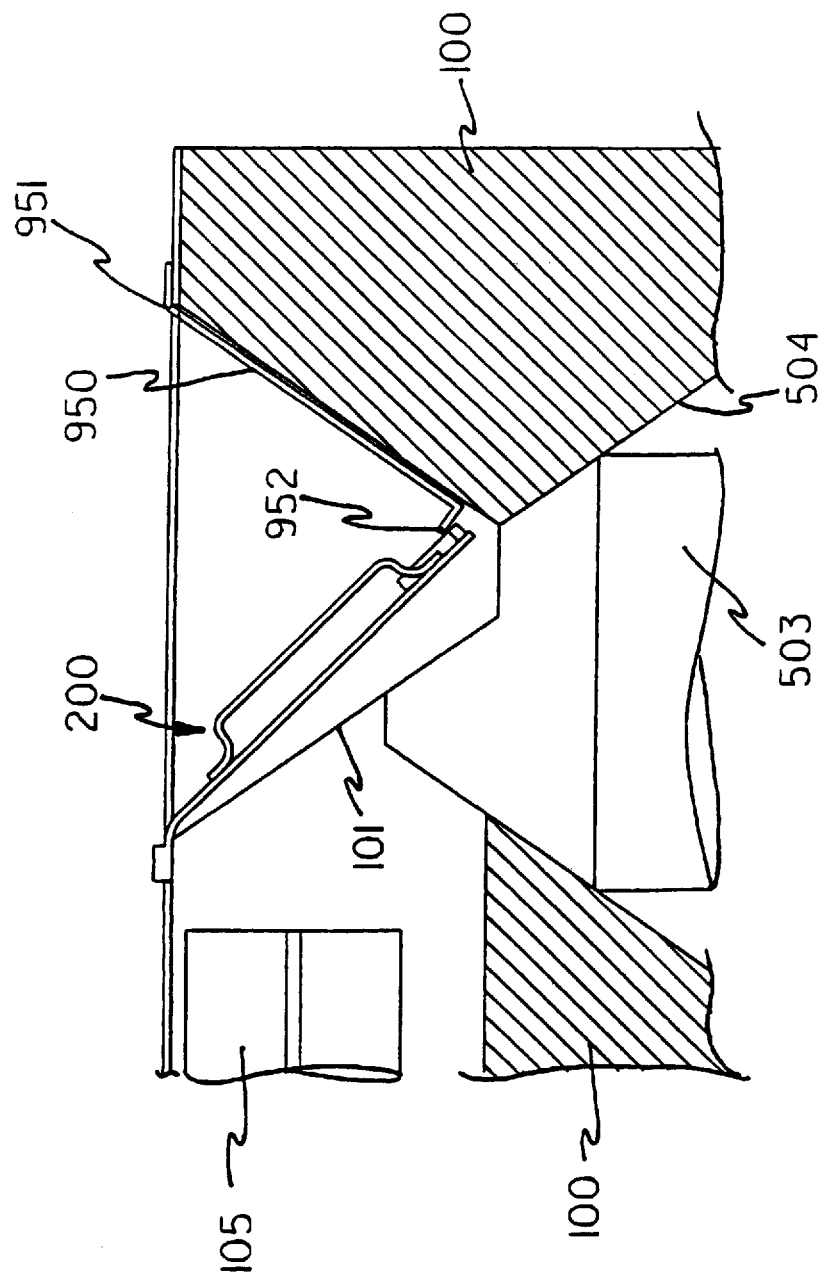
FIG. 16 is a side view cross section of FIG. 1 showing an end flap locking means

FIG. 16 shows yet another method for locking a beam steering means in place. In this image, a rigid locking flap 950 is anchored to substrate 100 with a cantilever hinge 951. Locking flap 950 is patterned to a predetermined length such that when deployed, the resulting interference with micromirror assembly 200 produces the desired deployment angle. For deployments of micromirror assembly 200 beyond 32 degrees, an additional vertical tip 952 may be required to secure the mechanical interference. Flap 950 must necessarily lie over micromirror assembly 200 during fabrication, and thus, requires an additional sacrificial and masking layer.

Figure 17:
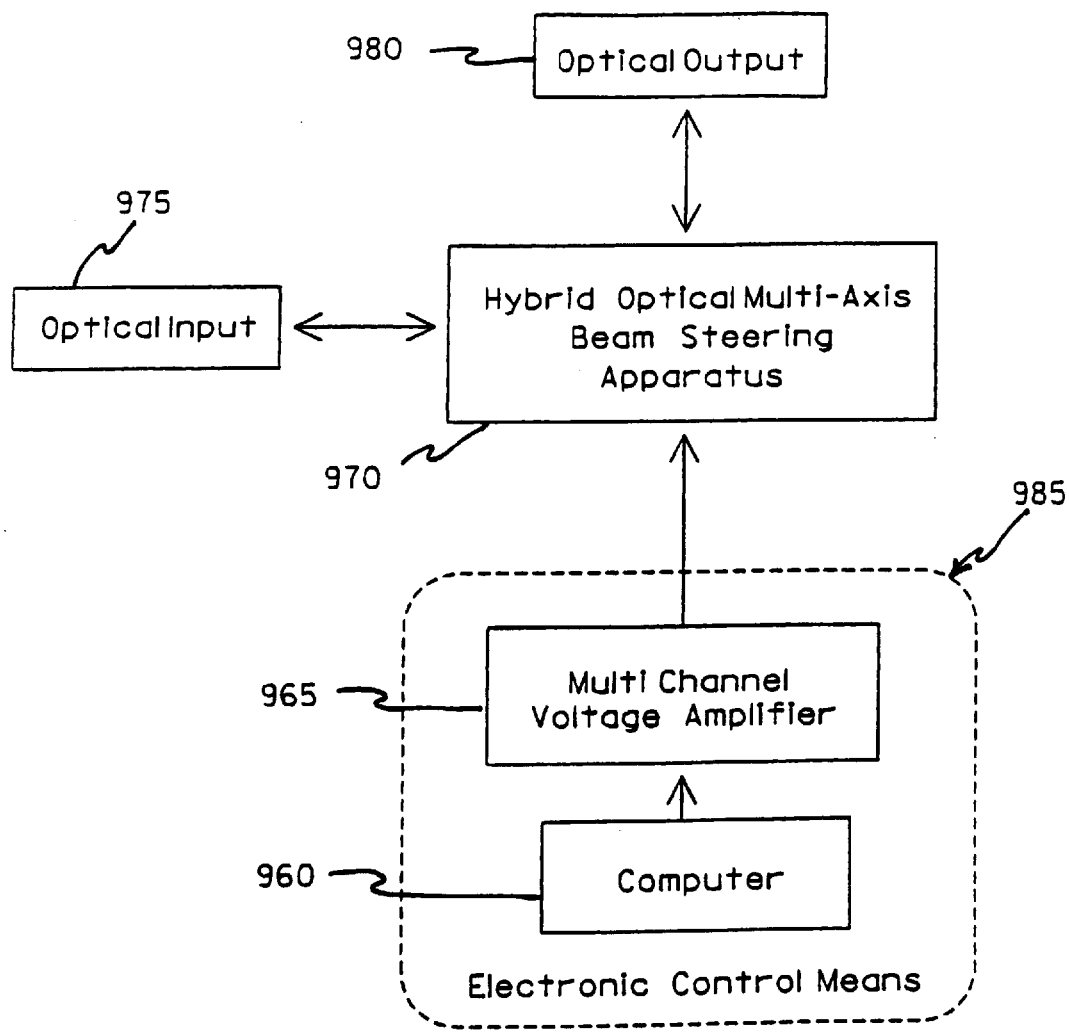
FIG. 17 shows the functionality blocks of an embodiment of the invention

FIG. 17 shows the functional blocks associated with integrating a hybrid optical multi-axis beam steering apparatus with a control means. In general, a computer 960 calculates the necessary mirror angles and rates, and transmits a request to a multi-channel voltage amplifier 965. The amplifier converts the digital request to a series of properly scaled voltages. The voltage signals are then communicated to bond pads 103A–F, for example. Taken together, 960 and 965 make up the electronic control means for driving any embodiment of a hybrid optical multi-axis beam steering apparatus 970. The desired beam steering transfer function is then established between the optical input 975 and the optical output 980. It is noted that input 975 and output 980 can have either a unidirectional or bi-directional beam path, depending on the intended application.

The invention, once completely assembled, can then be wire bonded in the usual fashion. Bond wires extend from an external control circuit to pads 103 A–F. The entire device can then be hermetically encapsulated, taking care not to permit potting resin to enter cavity 101 or cover optical element 503.

FABRICATION SEQUENCE

In accordance with an aspect of the invention a presently preferred fabrication sequence for the hybrid optical beam steering apparatus is set forth below.

Begin with double polished (100) silicon wafers having a low resistivity (1 ohm-cm).

Deposit one or two microns of PECVD $SiO_2$ on both sides of the wafer.

Define the sacrificial oxide pads with patterned photoresist and a BOE etch. Oxide isolation pads will be under bond pads 103A,B,D,E,F, oxide sacrificial pads will be under bar 109, under mirror 200, and in position 502.

Deposit LPCVD low stress silicon nitride (400 A) on both sides or just top side.

Open window through nitride over pad 103C and etch down to bare silicon.

Sputter Ti (100 A) for adhesion plus Au (300 A) and pattern to form mirror and lines across hinge areas. The Ti/Au may be patterned with a F115 plasma etch or aqua regia followed by a brief BOE etch.

Mask for lift-off or plate up of Au areas over all lines and pads except across the hinge area and the mirror area.

Remove Ti/Au seed if performing a plate-up, otherwise perform lift-off.

Deposit two microns of low stress nitride, low stress silicon carbide or anything impervious to BOE. An adhesion layer may be necessary prior to deposition for good bonding to the Au surface.

Provide a mask on the top surface which opens areas that will etch down to bare Si.

Etch 2500 A of low stress nitride or low stress silicon carbide etc., for a head start etch.

Provide a mask on the top surface which opens areas that will etch down to bare Si or Au pads, plus opens up the full hinge areas.

Plasma etch down to bare Si or Au pads leaving 2500 A thick cantilever and torsion hinges. V-groove area is now open.

Deposit a sacrificial oxide over top of wafer (1 micron).

Open hole 505 on bottom of wafer and plasma etch down to bare Si.

Protect the top side with high melting temperature wax and a carrier wafer.

Perform a BOE etch to remove sacrificial pad 502.

Place wafer in an anisotropic etchant, such as KOH, EDP, TMAH etc., until cavity 504 is fully formed.

Post-etch clean with a 1:1 solution of HCl and $H_2O_2$.

Remove wax and carrier wafer from top of wafer.

Form an oxide on the walls of cavity 504 using a high temperature steam or oxygen process, a wet electrochemical process, or a wet chemical process.

Wax carrier wafer to bottom of wafer

Mask and etch open holes in oxide layer for electrodes and electrode vias on top side of wafer.

Sputter a seed layer of Ti (100 A) plus Au (500 A) on top surface.

Mask and electroplate electrodes.

Mask and electroplate, or sputter and pattern solder bars.

Remove all oxide blankets and sacrificial pads with a BOE etch.

Anisotropically etch cavity 101 and v-groove 106 using KOH, EDP, TMAH etc.

Post-etch clean with a 1:1 solution of HCl and $H_2O_2$.

Spray on photoresist and open only over v-groove 106 and open areas around mirror 200 (optional).

Sputter a layer of Ti/Au into v-groove 106 and 101 (optional).

Remove photoresist.

Remove wax and carrier wafer from bottom of wafer.

Plasma etch cantilever and torsion hinges down to a thickness of approximately 400 A.

Electrically ground pad 103C and apply a positive voltage to pad 103D thereby causing micromirror assembly 200 to fully deploy downward into cavity 101.

While maintaining this position, pass current through pads 103A and 103F, thereby causing melting of the thermal adhesive or solder.

After removal of current, micromirror assembly 200 is permanently locked into position.

Insert optical element means 503 into cavity 504 and cement or self-solder in place.

Cement or self-solder primary optical means 105 into groove 106.

Cement or self-solder cover plate 107 over cavity 101.

Wire bond all pads to electrical control means.

I claim:

1. An optical beam steering apparatus comprising:
   a substrate defining one or more aligned cavities:
   a primary optical path means for accommodating the passage of a light beam;
   an upper cavity provided in a portion of said substrate that is aligned to a predetermined degree of precision and in direct communication with said primary optical path means;
   a beam steering means provided in said upper cavity for controllably directing said beam;
   wherein said beam steering means comprises
      a gimbaled micromirror nested into one or more sets of gimbaled hinge means, wherein each set of gimbaled hinge means defines an independent axes of rotation of said gimbaled micromirror with respect to a frame holding an outermost set of said gimbaled hinge means and said outermost frame is connected at one edge with an upper surface of said substrate by a cantilever hinge means such that said beam steering means is capable of deflecting downwards into said upper cavity;
      a plurality of independently addressable electrodes disposed for positioning said gimbaled micromirror;
      a plurality of electrical lines in direct electrical communication with said independently addressable electrodes; and
      an electronic control means in communication with said electrical lines, such that said gimbaled micromirror is electrically driven to a predetermined angular orientation with respect to said outer most frame.

2. An apparatus according to claim 1 wherein said gimbaled micromirror is provided with a conductive film adjacent to its surface and across said gimbaled hinge means such that said gimbaled micromirror is in electrical communication with said electronic control means.

3. An optical beam steering apparatus comprising:
   a substrate defining one or more aligned cavities;
   a primary optical path means for accommodating the passage of a light beam;
   an upper cavity provided in a portion of said substrate that is aligned to a predetermined degree of precision and in direct communication with said primary optical path means;
   a beam steering means provided in said upper cavity for controllably directing said beam;
   wherein said beam steering means comprises
      a hybrid micromirror nested in any combination of cantilever hinge means and gimbaled hinge means providing one or more independent axes of rotation with respect to a frame holding the outer most hinge structure;
      wherein said outer most frame is connected at one edge with the surface of said substrate thereby forming a cantilever hinge means such that said beam steering means is capable of deflecting downwards into said upper cavity;
      a plurality of independently addressable electrodes disposed adjacent to said hybrid micromirror;
      a plurality of electrical lines in direct electrical communication with said independently addressable electrodes;
      an electronic control means in communication with said electrical lines, such that said hybrid micromirror is electrically driven to a predetermined angular orientation with respect to said outer most frame, and
   wherein said hybrid micromirror is provided with a conductive film adjacent to its surface and across said cantilever hinge means and said gimbaled hinge means such that said hybrid micromirror is in electrical communication with said electronic control means.

4. An optical beam steering apparatus comprising:
   a substrate defining one or more aligned cavities;
   a primary optical path means for accommodating the passage of a light beam;
   an upper cavity provided in a portion of said substrate that is aligned to a predetermined degree of precision and in direct communication with said primary optical path means;
   a beam steering means provided in said upper cavity for controllably directing said beam;
   wherein said beam steering means is rigidly affixed in a predetermined orientation within said upper cavity and wherein a mechanical locking means for rigidly affixing said beam steering means within said upper cavity comprises one or more distal or lateral flaps extending beyond the distal or lateral edges, respectively, of said beam steering means such that when said beam steering means is deflected into said upper cavity, said distal or lateral flaps drag against one or more walls of said upper cavity and adhere to said wall by said surface forces.

5. An apparatus according to claim 4 wherein said self solder means is provided on said distal or lateral flaps.

6. An optical beam steering apparatus comprising:
   a substrate defining one or more aligned cavities;
   a primary optical path means for accommodating the passage of a light beam;
   an upper cavity provided in a portion of said substrate that is aligned to a predetermined degree of precision and in direct communication with said primary optical path means;
   a beam steering means provided in said upper cavity for controllably directing said beam;
   wherein said beam steering means is rigidly affixed in a predetermined orientation within said upper cavity and wherein said mechanical locking means comprises one or more lockdown flaps extending beyond the edges of said upper cavity, such that after said beam steering means is deflected to said predetermined orientation within said upper cavity, said lockdown flaps are deflected downwards into said upper cavity until they adhere to said upper cavity wall by said surface forces, thereby preventing said beam steering means from deflecting upwards due to direct mechanical interference with said lockdown flaps.

7. An apparatus according to claim 6 wherein said self solder means is provided on said lockdown flaps.

8. An optical beam steering apparatus comprising:
   a single substrate body defined by an upper surface and formed with at least one cavity including an upper cavity formed on the upper surface of the substrate body and a primary optical path for accommodating the passage of a light beam aligned in a predetermined orientation with the upper cavity; and a beam steering assembly having a steerable element positioned substantially adjacent the upper cavity for controllably directing the light beam in a direction substantially normal to the upper surface of the substrate body.

9. The optical apparatus according to claim 8 wherein the beam steering assembly is placed at a predetermined orientation within the upper cavity for controllably altering the optical path of an impinging beam in at least one direction that is emanating from or propagating towards the primary optical path.

10. The optical apparatus according to claim 8 wherein the primary optical path is a waveguide.

11. The optical apparatus according to claim 8 wherein the primary optical path is a groove formed in the substrate body for accommodating the passage of the light beam.

12. The optical apparatus according to claim 11 wherein the groove is a V-groove.

13. The optical apparatus according to claim 12 further comprising a primary optical element for accommodating the light beam wherein the primary optical element is provided within the V-groove.

14. The optical apparatus according to claim 13 wherein the primary optical element is selected from the group consisting of optical waveguides, refractive optical elements, reflective optical elements, phase optical elements, light detectors, beam splitters, lasers, light emitting diodes, incandescent light sources, fluorescent light sources, natural light sources and plasma light sources.

15. The optical apparatus according to claim 8 wherein the substrate body is formed of a crystal having a differential etch rate between different crystallographic planes.

16. The optical apparatus according to claim 8 wherein at least one cavity is anisotropically etched into the substrate body.

17. The optical apparatus according to claim 8 wherein the substrate body is formed of a solid material that supports the molding of geometrically precise cavities.

18. The optical apparatus according to claim 8 further comprising a cover plate for covering at least one cavity and an adjacent surface of the substrate body.

19. The optical apparatus according to claim 18 wherein the cover plate is formed from a material with at least one characteristic selected from the group consisting of optically opaque, transparent, translucent, electrically conductive, and electrically insulative.

20. The optical apparatus according to claim 8 further comprising:
a hinge for flexibly connecting the beam steering assembly with an upper edge of the upper cavity that is not coincident with the primary optical path;
wherein the beam steering assembly includes at least one reflective surface such that the beam steering assembly is disposed within the upper cavity so that an impinging beam of light emanating from the primary optical path is controllably deflected in the same general direction the upper cavity is facing and wherein a beam of light entering from the same general direction the upper cavity is facing is controllably deflected towards said primary optical path.

21. A hybrid optical steering system comprising:
a single substrate body defined by an upper surface and a lower surface and formed with at least one cavity including an upper cavity formed on the upper surface of the substrate body and a primary optical path for accommodating the passage of a light beam aligned in a predetermined orientation with the upper cavity;

a lower cavity formed on the lower surface of the substrate body having a predetermined alignment with respect to the upper cavity;
a suspended bridge spanning the primary optical path at a juncture between the primary optical path and the upper cavity;
a beam steering assembly having a steerable element positioned substantially adjacent the upper cavity for controllably directing the light beam through at least a portion of the substrate body; and
a hinge for flexibly anchoring the beam steering assembly to the suspended bridge wherein the beam steering assembly has at least one reflective surface and is rotated towards the upper cavity so that an impinging beam of light emanating from the primary optical path is controllably deflected in a direction generally from the upper cavity to the lower cavity and an impinging beam of light entering from the lower cavity is controllably deflected in a direction generally from the lower cavity to the upper cavity towards the primary optical path.

22. The optical apparatus according to claim 21 further comprising: a secondary optical element for accommodating a beam of light disposed within the lower cavity of the substrate body;
means for aligning the secondary optical element within the lower cavity so that the secondary optical element is substantially centered in the lower cavity and the optical axis of the secondary optical element is aligned at a predetermined angle with respect to the lower surface of the substrate body.

23. The optical apparatus according to claim 22 wherein the secondary optical element is selected from the group consisting of optical fibers, refractive optical elements, reflective optical elements, phase optical elements, light detectors, beam splitters, lasers, light emitting diodes, incandescent light sources, fluorescent light sources, natural light sources and plasma light sources.

24. A micro-machined steerable optical device comprising:
a single substrate body defined by an upper surface and formed with at least one cavity including an upper cavity formed on the upper surface of the substrate body and a primary optical path for accommodating the passage of a light beam aligned in a predetermined orientation with the upper cavity;
a beam steering assembly having a steerable element positioned substantially adjacent to the upper cavity for controllably directing the light beam through at least a portion of the substrate body; and
a frame and a gimbaled micromirror nested in at least one set of gimbaled hinges including a relatively outermost set of gimbaled hinges that provides additional axes of rotation of the gimbaled micromirror with respect to the frame and wherein the frame holds an outermost set of the gimbaled hinges and is connected to the upper surface of the substrate body by a hinge so that the beam steering assembly may deflect a light beam in a direction towards the upper surface.

25. The steerable optical device according to claim 24 further comprising:
a plurality of independently addressable electrodes disposed about the gimbaled micromirror for positioning the micromirror in direct electrical communication with a plurality of electrical lines; and
electronic control means in communication with the electrical lines for electrically driving the gimbaled micromirror to a predetermined angular orientation with respect to the frame.

26. The steerable optical device according to claim 24 wherein the gimbaled micromirror is defined by an electrically conductive and optically reflective surface and further includes a conductive film.

27. The steerable optical device according to claim 26 further including an insulating film covering at least a portion of the gimbaled micromirror.

28. A micro-machined steerable optical device comprising:
   a single substrate body defined by an upper surface and formed with at least one cavity including an upper cavity formed on the upper surface of the substrate body and a primary optical path for accommodating the passage of a light beam aligned in a predetermined orientation with the upper cavity;
   a beam steering assembly having a steerable element positioned substantially adjacent to the upper cavity for controllably directing the light beam through at least a portion of the substrate body; and
   a frame and a cantilevered micromirror nested in at least one set of cantilevered hinges including a relatively outermost set of cantilevered hinges that provides additional axes of rotation of the cantilevered micromirror with respect to the frame and wherein the frame holds an outermost set of the cantilevered hinges and is connected to the upper surface of the substrate body by a hinge so that the beam steering assembly may deflect a light beam in a direction towards the upper surface.

29. The steerable optical device according to claim 28 further comprising:
   a plurality of independently addressable electrodes disposed about the cantilevered micromirror for positioning the micromirror in direct electrical communication with a plurality of electrical lines; and
   electronic control means in communication with the electrical lines for electrically driving the cantilevered micromirror to a predetermined angular orientation with respect to the frame.

30. The steerable optical device according to claim 28 wherein the cantilevered micromirror is defined by an external surface and is formed with a conductive film adjacent to its external surface and across the at least one set of cantilevered hinges so that the cantilevered micromirror is in electrical communication with the electronic control means.

31. A micro-machined steerable optical device comprising:
   a single substrate body defined by an upper surface and formed with at least one cavity including an upper cavity formed on the upper surface of the substrate body and a primary optical path for accommodating the passage of a light beam aligned in a predetermined orientation with the upper cavity;
   a beam steering assembly having a steerable element positioned substantially adjacent to the upper cavity for controllably directing the light beam through at least a portion of the substrate body; and
   a frame and a hybrid micromirror nested in at least one set of cantilevered and gimbaled hinges including a relatively outermost set of hinges that provides additional axes of rotation of the hybrid micromirror with respect to the frame and wherein the frame holds an outermost set of the hinges and is connected to the upper surface of the substrate body by a hinge so that the beam steering assembly may deflect a light beam in a direction towards the upper surface.

32. The steerable optical device according to claim 31 further comprising:
   a plurality of independently addressable electrodes disposed about the hybrid micromirror for positioning the micromirror in direct electrical communication with a plurality of electrical lines; and
   electronic control means in communication with the electrical lines for electrically driving the hybrid micromirror to a predetermined angular orientation with respect to the frame.

33. The steerable optical device according to claim 31 wherein the hybrid micromirror is defined by an electrically conductive and optically reflective surface and further includes a conductive film.

34. The steerable optical device according to claim 33 further including an insulating film covering at least a portion of the hybrid micromirror.

35. An optical head assembly comprising:
   a single substrate body defined by an upper surface and formed with at least one cavity including an upper cavity formed on the upper surface of the substrate body and a primary optical path for accommodating the passage of a light beam aligned in a predetermined orientation with the upper cavity; and
   a beam steering assembly rigidly affixed in a predetermined orientation within at least a portion of the upper cavity having a steerable element positioned substantially adjacent the upper cavity for controllably directing the light beam through at least a portion of the upper cavity.

36. The optical apparatus according to claim 35 wherein the beam steering assembly is rigidly affixed within the upper cavity by chemical bonding with a chemical bonding agent.

37. The optical apparatus according to claim 35 wherein the beam steering assembly is rigidly affixed within the upper cavity with a surface force selected from the group consisting of surface tension, Van der Waals, and residual surface charge.

38. The optical apparatus according to claim 35 wherein the beam steering assembly is rigidly affixed within the upper cavity by thermal bonding with a thermal bonding agent.

39. The optical apparatus according to claim 35 further including self soldering means for rigidly affixing the beam steering assembly within the upper cavity.

40. The optical apparatus according to claim 35 further including a mechanical locking assembly for rigidly affixing the beam steering assembly within the upper cavity having at least one flap extending beyond the edges of the beam steering assembly so that when the beam steering assembly is deflected into the upper cavity the at least one flap drags against one or more walls of the upper cavity and adheres to each wall by a surface force.

41. The optical apparatus according to claim 40 wherein self solder means is provided on the at least one flap.

42. The optical apparatus according to claim 40 wherein the mechanical locking assembly comprises one or more lockdown flaps extending beyond the edges of the upper cavity so that after the beam steering assembly is deflected to the predetermined orientation within the upper cavity the lockdown flaps are deflected downwards into the upper cavity until adhered to the upper cavity wall by a surface force thereby preventing the beam steering assembly from deflecting from other directions due to direct mechanical interference with the one or more lockdown flaps.

43. The optical apparatus according to claim 42 wherein self solder means is provided on the one or more lockdown flaps.

44. The optical apparatus according to claim 40 wherein the mechanical locking assembly is characterized by an incomplete anisotropic etch of the upper cavity and the upper cavity is defined by a floor wherein the floor of the upper cavity is etched to a predetermined depth such that mechanical interference between a fully deflected beam steering assembly and the floor defines the predetermined orientation.

45. The optical apparatus according to claim 44 wherein the beam steering assembly is defined by a distal end and self solder means is provided on the distal end of the beam steering assembly.

* * * * *